(12) United States Patent
Fox, Jr.

(10) Patent No.: US 8,851,426 B1
(45) Date of Patent: Oct. 7, 2014

(54) ENHANCED CRUCIFORM PARACHUTE

(71) Applicant: Roy L. Fox, Jr., Belleville, WV (US)

(72) Inventor: Roy L. Fox, Jr., Belleville, WV (US)

( * ) Notice: Subject to any disclaimer, the term of this patent is extended or adjusted under 35 U.S.C. 154(b) by 0 days.

(21) Appl. No.: 13/956,071

(22) Filed: Jul. 31, 2013

(51) Int. Cl.
*B64D 17/02* (2006.01)

(52) U.S. Cl.
CPC ........................... *B64D 17/02* (2013.01)
USPC .......................................... 244/145

(58) Field of Classification Search
USPC .................. 244/145, 142, 138 R; 446/49
See application file for complete search history.

(56) References Cited

U.S. PATENT DOCUMENTS

| | | | | |
|---|---|---|---|---|
| 1,834,370 | A * | 12/1931 | Leroy | 244/145 |
| 2,770,432 | A * | 11/1956 | Thompson | 244/145 |
| 3,531,067 | A * | 9/1970 | Mitchell | 244/145 |
| 5,037,042 | A * | 8/1991 | Calianno | 244/145 |
| 5,839,695 | A | 11/1998 | Puskas | |
| 6,443,396 | B1 | 9/2002 | Berland | |
| 7,261,258 | B1 * | 8/2007 | Fox, Jr. | 244/145 |
| 8,118,262 | B2 * | 2/2012 | Jameson | 244/152 |

FOREIGN PATENT DOCUMENTS

GB       1313037 A *  6/1980

* cited by examiner

*Primary Examiner* — Chrstopher P Ellis
(74) *Attorney, Agent, or Firm* — Snell & Wilmer L.L.P.

(57) ABSTRACT

A modified cruciform parachute is configured to provide improved aerodynamic efficiency and/or reduced construction expense. In an exemplary parachute, a shoulder panel is disposed between a center panel and a side panel to at least partially equalize load path lengths in the cruciform parachute. Components of the parachute may be two-dimensional in construction in order to reduce construction expense. Components of the parachute may also be modular and/or interchangeable. The cruciform parachute may be steerable and/or may be configured to glide via inclusion of venting means on the parachute canopy.

9 Claims, 21 Drawing Sheets

ENHANCED CRUCIFORM PARACHUTE

TECHNICAL FIELD

The present disclosure relates to parachutes, and more particularly to cruciform parachutes.

BACKGROUND

Parachutes are an integral component of systems used to deliver cargo or loads aerially to remote or inaccessible locations. To deliver a load aerially, the load is furnished with a parachute delivery system and transported to the delivery site by aircraft. Upon reaching the delivery site, the load is released, ejected or dropped from the aircraft. Shortly after release, a parachute is deployed, which is typically attached to the load by suspension lines and other rigging. The deployed parachute decelerates the descending load to a velocity at which the load may land on the ground or water without damage.

Prior parachutes, including prior cruciform-type parachutes, have suffered from various deficiencies, such as excessive manufacturing expense, aerodynamic (i.e., structural) inefficiency, unequal load and/or force distribution within the parachute, lack of steerability, and/or the like. Therefore, improved cruciform parachutes and related methods of construction and use remain desirable.

SUMMARY

In an exemplary embodiment, a modified cruciform parachute comprises a square center panel, and a square side panel. The side panel has similar dimensions to the center panel. The modified cruciform parachute further comprises a shoulder panel coupled to the side panel and to the center panel. The shoulder panel is configured in the shape of an isosceles triangle. The shoulder panel is coupled to the center panel along a first side of the shoulder panel. The shoulder panel is coupled to the side panel along a second side of the shoulder panel, and the third side of the shoulder panel is configured with a length of $(\sqrt{2}-1)$ times the length of the first side and the second side.

In another exemplary embodiment, a modified cruciform parachute comprises a square center panel, and a square side panel coupled to the center panel. The side panel has similar dimensions to the center panel. The modified cruciform parachute further comprises a peripheral panel coupled to the side panel. The peripheral panel equalizes the length of a first load path and a second load path in the modified cruciform parachute.

In another exemplary embodiment, a modified cruciform parachute comprises a center panel having a center panel side length along a first side of the center panel, and a side panel having a side panel side length along a first side of the side panel. The side panel side length is equal to the center panel side length. The modified cruciform parachute further comprises a shoulder panel configured in the shape of an isosceles triangle. The shoulder panel is coupled to the first side of the side panel along a first side of the shoulder panel, and the shoulder panel is coupled to the first side of the center panel along a second side of the shoulder panel. The third side of the shoulder panel is configured with a length of $(\sqrt{2}-1)$ times the length of the first side and the second side of the shoulder panel.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

DETAILED DESCRIPTION

Figure 1A:
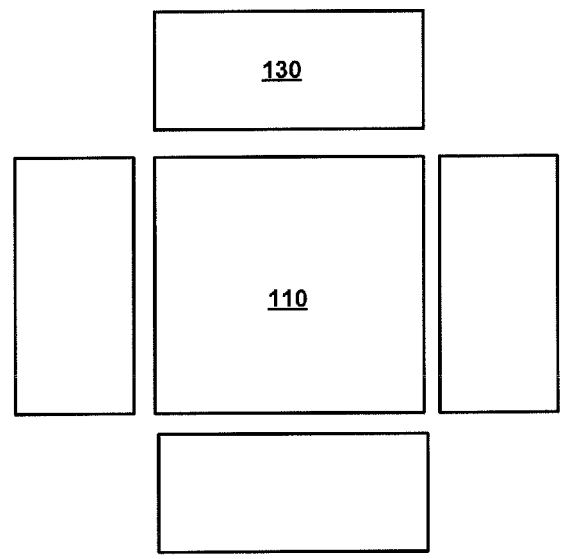
FIG. 1A illustrates components of a cruciform parachute.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for parachute construction, configuration, reinforcement, deployment, recovery, reefing, disreefing, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical modified cruciform parachute.

For pressure containing vessels, a sphere is more efficient than any other known shape. Spheres, however, typically aren't convenient shapes for transporting material (such as high pressure gases); as a result, it is common to see the tank of the propane transporting truck or similar constructed from a cylinder with a dome (hemispherical cap) on each end. It will be appreciated that conventional "round" parachutes may be considered to be somewhat akin to a cylinder (the column of air directly under the parachute canopy) and a hemispherical cap (the parachute canopy) because these two components are subjected to more than ambient pressure. The cylinder in this case is very inefficient, leaking air in all directions and causing much of it to spill around the parachute canopy. However, a parachute canopy is much more efficient than the air column and, therefore, the closer the canopy is to being hemispherical, the more structurally efficient it is, when compared to a canopy that has more deviation from hemispherical. Because of inward tension produced by the parachute suspension members, the canopy of a parachute (while generally thought of as being hemispherical) is usually somewhat more than just the northern half of a sphere, with the canopy skirt actually located slightly south of the "equator"). Even parachute canopies constructed as flat discs, typically made from radiating wedge shaped gores, become generally hemispherical when inflated due to the internal pressure and downward and inward tension of the suspension members. Such flat disc parachutes, known as flat circulars, are relatively strong and relatively inexpensive to construct, but they contain much more fabric than is needed for good performance. If parachute weight and/or volume are of concern, reshaping the radiating gores is typical but, with the gore reshaping comes more design and construction time in addition to more fabric waste.

Prior cruciform parachutes addressed, at least partially, such concerns with design and construction time and fabric waste. Because of its simple shape, a cruciform parachute is more economical to construct than any other parachute type. However, due to the roughly box-like canopy shape, the cruciform parachute isn't nearly as structurally efficient as is a parachute with a generally hemispherical shape.

With reference now to FIG. 1A, typical prior simple cruciform (or cross-style) parachute canopies comprised a center panel 110 and side panels 130. While center panel 110 is typically square, the width to length ratio of the side panels 130 may vary, depending on the desires of the parachute designer. Both center panel 110 and side panels 130 may be fabricated from multiple sub-panels and each panel may have reinforcements and venting orifices distributed within it. Additionally, the panels may be closely joined, essentially forming a single-piece parachute canopy, or they may be joined only at discrete points, allowing venting between the panels.

Simple cruciform parachutes are relatively economical to fabricate, but they have some disadvantages when compared to certain other types of parachutes. For instance, due to the large, roughly triangular openings between adjacent side panels, it is easy for other portions of the parachute to pass between two side panels during deployment dynamics, which results in an entangled parachute. Another disadvantage of the simple cruciform parachute is that the triangular openings between the adjacent sides allow the sides to become somewhat propeller-like, causing the parachute to rotate as it descends.

A conventional cruciform parachute canopy (for example, as illustrated in FIG. 1A), which consists of a square center section 110 and four square or rectangular sides 130, was redesigned by Puskas (U.S. Pat. No. 5,839,695) to form a cruciform parachute canopy having a square center section and four trapezoidal (tapered) sides. The Puskas design allowed for venting between the center section and the sides.

Figure 1B:
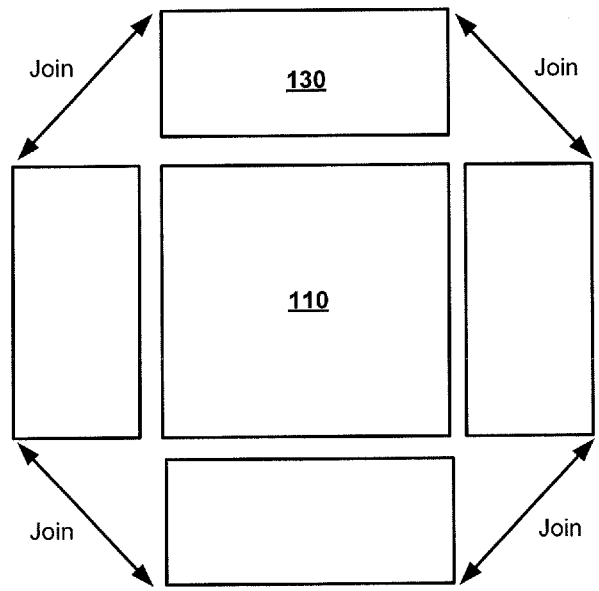
FIG. 1B illustrates components of a cruciform parachute wherein side panels may be joined together at the parachute skirt.

Berland (U.S. Pat. No. 6,443,396) chose to partially join side panels 130 together (for example, as illustrated in FIG. 1B) in an attempt to address the deployment entanglement and rotational issues of the typical cruciform parachute. Berland has some advantages over Puskas in that it has a continuous skirt band, which decreases the probability of canopy malfunctions during deployment and inflation. It is also less likely to rotate as it descends. However, the Berland design causes the canopy skirt region to be smaller than the upper portion of the canopy, making for a somewhat inefficient use of the canopy fabric between the square center section and the skirt band.

Figure 1C:
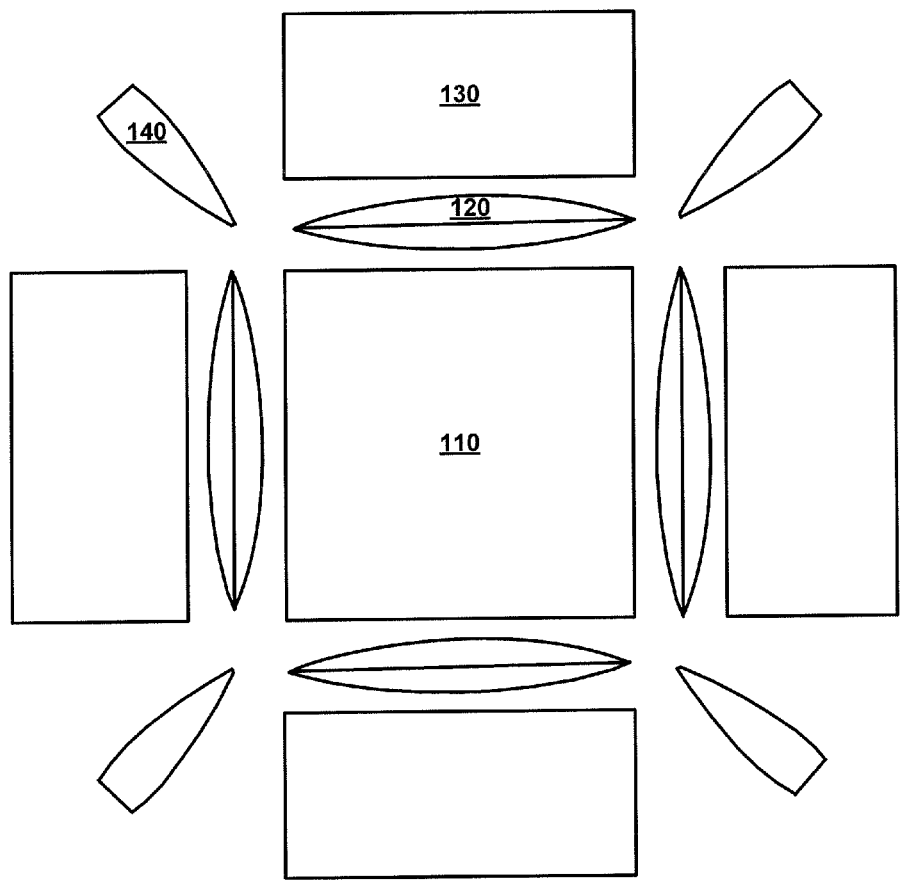
FIG. 1C illustrates components of a modified cruciform parachute.

Fox (U.S. Pat. No. 7,261,258) added flat panels 140 between the side panels 130, and also added 3-dimensional panels 120 between the side panels 130 and the center panel 110, for example as illustrated in FIG. 1C. The addition of these flat panels 140 and 3-dimensional panels 120 caused the cruciform parachute canopy to more closely resemble a hemispherical parachute canopy, which allowed it to overcome the entanglement and rotational issues of the typical cruciform parachute, and, due to its improved shape, made it capable of sustaining higher deployment forces than a typical cruciform parachute could sustain. This design permits all panels to be joined with textile tapes or cord, allowing venting between all panels. The hemispherical canopy shape is capable of withstanding opening forces that may be encountered during high speed deployments. However, panel 120 is fabricated as a 3-dimensional part, adding undesirable material and labor costs, for example for parachutes that will only be exposed to relatively low speed deployments.

In various exemplary embodiments, and in accordance with principles of the present disclosure, modified cruciform parachutes overcome various shortcomings of certain prior parachutes. Aerodynamic inefficiency may be reduced. Parachute failure rates at high dynamic pressures may be reduced. Construction costs may be reduced. Parachute construction may be simplified. Additionally, exemplary modified cruciform parachutes, for example modified cruciform parachute 200, 400, 500 and/or 600, may be configured with improved steering and/or gliding capabilities.

Figure 2A:
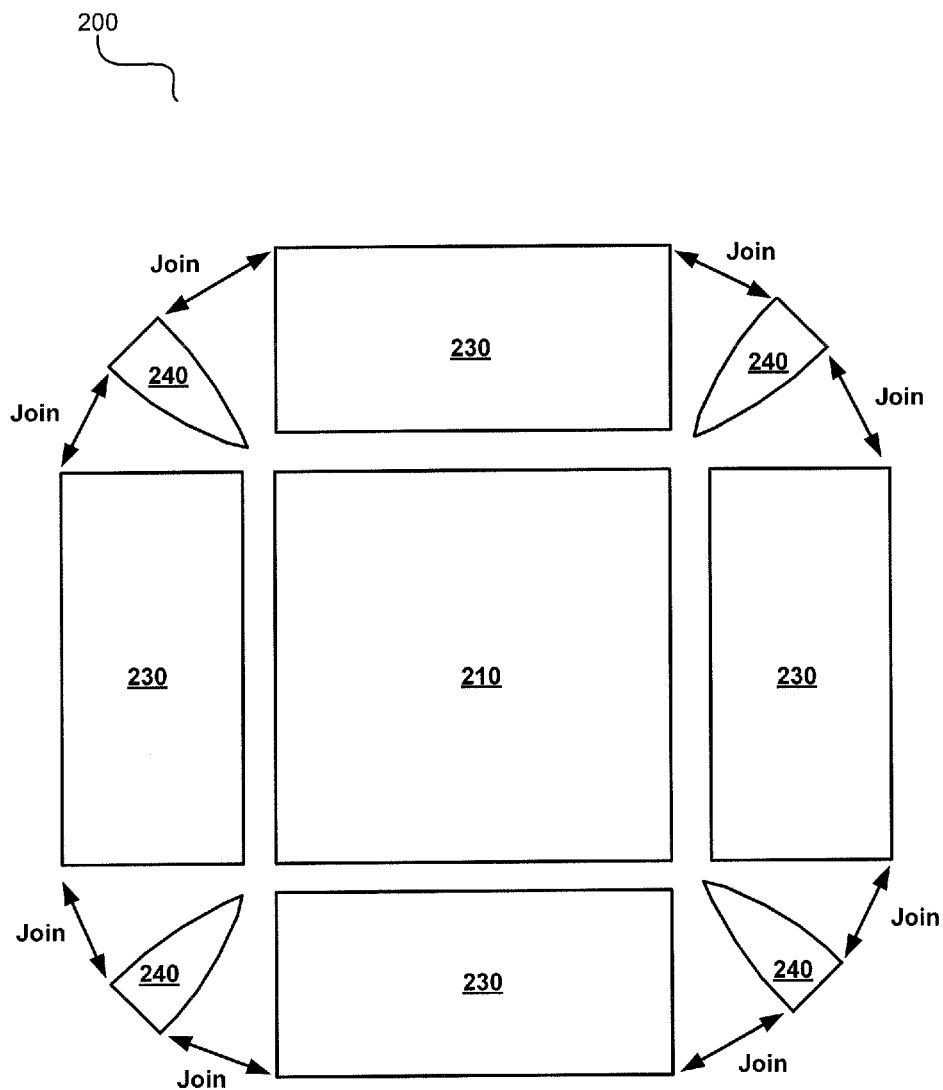
FIG. 2A illustrates exemplary components of a modified cruciform parachute in accordance with an exemplary embodiment.
Figure 2B:
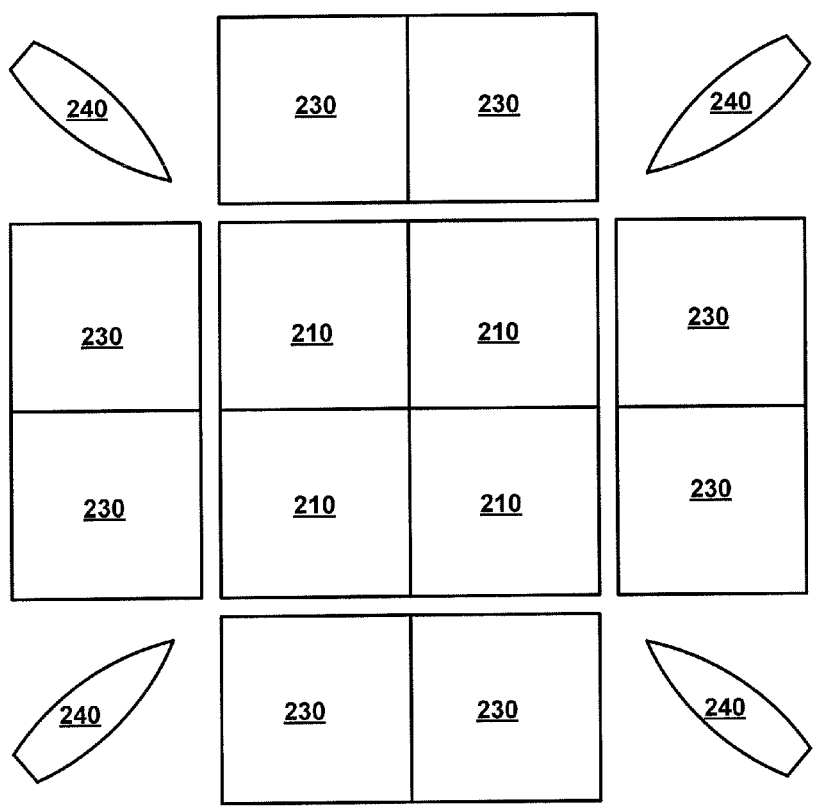
FIG. 2B illustrates exemplary components of a modified cruciform parachute wherein side panels may be coupled to additional panels disposed therebetween in accordance with an exemplary embodiment.

Turning now to FIGS. 2A and 2B, in accordance with an exemplary embodiment a modified cruciform parachute 200 comprises at least one center panel 210, a plurality of side panels 230, and a plurality of corner panels 240. Center panel 210, side panels 230, and corner panels 240 are coupled together to form a parachute canopy.

Modified cruciform parachute 200 may be configured to be compatible for use with an inlet chute reefing device, for example as disclosed in U.S. Pat. No. 8,096,509 to Fox, the contents of which are incorporated herein by reference in their entirety.

In various exemplary embodiments, center panel 210 comprises a suitable material, for example a textile and/or film, such as nylon, mylar, and/or the like. Center panel 210 may be square, rectilinear, pentagonal, hexagonal, and/or the like, as desired. Center panel 210 may be monolithic; alternatively, center panel 210 may be comprised of sub-panels. Stated another way, center panel 210 may be comprised of multiple center panels 210. For example, as illustrated in FIG. 2B, in an exemplary embodiment the center portion of the parachute canopy comprises four center panels 210. These combined panels may be considered to be a center panel 210. When multiple center panels 210 are utilized in modified cruciform parachute 200, venting may be provided therein and/or therebetween. Center panels 210 may be joined to one another and/or to other components of modified cruciform parachute 200 via any suitable means, for example via stitching, taping, lacing, gluing, and/or the like.

In various exemplary embodiments, center panel 210 may be similarly sized and/or identical to other panels in modified cruciform parachute 200, for example side panel 230. In this manner, manufacturing costs may be reduced, and assembly and/or repair of modified cruciform parachute 200 may be simplified, because components may be interchangeable.

In an exemplary embodiment, modified cruciform parachute 200 comprises four center panels 210. In another exemplary embodiment, modified cruciform parachute 200 comprises nine center panels 210. In yet another exemplary embodiment, modified cruciform parachute 200 comprises sixteen center panels 210. Any suitable number and/or size of center panels 210 may be utilized, for example in order to achieve a desired configuration of modified cruciform parachute 200.

In various exemplary embodiments, modified cruciform parachute 200 comprises a plurality of side panels 230. Side panel 230 comprises a suitable material, for example a textile and/or film, such as nylon, mylar, and/or the like. In modified cruciform parachute 200, side panel 230 may comprise a similar material to other panels, for example center panel 210; moreover, side panel 230 may comprise different materials than other panels, for example in order to achieve a desired strength, flexibility, and/or the like. Side panel 230 may be square, rectilinear, trapezoidal, and/or the like, as desired. Side panel 230 may be monolithic; alternatively, side panel 230 may be comprised of sub-panels. Stated another way, side panel 230 may be comprised of multiple side panels 230. For example, as illustrated in FIG. 2B, in an exemplary embodiment each side portion of the parachute canopy comprises two square side panels 230. These combined panels may be considered to be a rectangular side panel 230. When multiple side panels 230 are utilized in modified cruciform parachute 200, venting may be provided therein and/or therebetween. Side panels 230 may be joined to one another and/or to other components of modified cruciform parachute 200 via any suitable means, for example via stitching, taping, lacing, gluing, and/or the like.

In various exemplary embodiments, side panel 230 may be similarly sized and/or identical to other panels in modified cruciform parachute 200, for example center panel 210. In this manner, manufacturing costs may be reduced, and assembly and/or repair of modified cruciform parachute 200 may be simplified.

In an exemplary embodiment, modified cruciform parachute 200 comprises four side panels 230, with one disposed on each side of center panel 210. In another exemplary embodiment, modified cruciform parachute 200 comprises eight side panels 230, with two disposed on each side of center panel 210 (for example, as illustrated in FIG. 2B). In yet another exemplary embodiment, modified cruciform parachute 200 comprises twelve side panels 230. Any suitable number and/or size of side panels 230 may be utilized, for example in order to achieve a desired configuration of modified cruciform parachute 200.

In various exemplary embodiments, modified cruciform parachute 200 comprises a plurality of corner panels 240. Corner panel 240 is configured to allow modified cruciform parachute 200 to more closely resemble a hemispherical parachute when deployed, improving aerodynamic efficiency. Additionally, corner panel 240 may be configured to facilitate reefing of modified cruciform parachute 200.

In various exemplary embodiments, corner panel 240 comprises a suitable material, for example a textile and/or film, such as nylon, mylar, and/or the like. In modified cruciform parachute 200, corner panel 240 may comprise a similar material to other panels; moreover, corner panel 240 may comprise different materials than other panels, for example in order to achieve a desired strength, flexibility, and/or the like. Corner panel 240 may be tapered, triangular, curvilinear, and/or the like, as suitable, in order to achieve a desired inflated configuration of modified cruciform parachute 200. Corner panel 240 may be monolithic; alternatively, corner panel 240 may be comprised of sub-panels. Stated another way, corner panel 240 may be comprised of multiple corner panels 240. For example, in an exemplary embodiment two triangular corner panels 240 may be disposed adjacent to one another and coupled together to form a larger, triangular-shaped corner panel 240. These combined panels may be considered to be a corner panel 240. When corner panels 240 are utilized in modified cruciform parachute 200, venting may be provided therein, therebetween, and/or between corner panels 240 and other components of modified cruciform parachute 200, for example between a corner panel 240 and a side panel 230. Corner panels 240 may be joined to one another and/or to other components of modified cruciform parachute 200 via any suitable means, for example via stitching, taping, lacing, gluing, and/or the like.

In an exemplary embodiment, for example as illustrated in FIGS. 2A and 2B, modified cruciform parachute 200 comprises four corner panels 240, with one corner panel 240 disposed at each "corner" of the parachute canopy (i.e., approximately at 45, 135, 225, and 315 degrees). In another exemplary embodiment, modified cruciform parachute 200 comprises four corner panels 240, with one corner panel 240 disposed at approximately 0, 90, 180, and 270 degrees on the parachute canopy. In yet other exemplary embodiments, with momentary reference to FIG. 4A, an exemplary modified cruciform parachute (for example, modified cruciform parachute 400) may comprise eight corner panels (for example, corner panels 440) spaced approximately equally about the canopy perimeter.

Moreover, modified cruciform parachute 200 may comprise any suitable number of corner panels 240, and such corner panels 240 may be disposed at any compass location around the canopy perimeter, in order to achieve a desired configuration of modified cruciform parachute 200.

With reference now to FIGS. 2A, 2B, 3A, 4A, and 5A in various exemplary embodiments, a modified cruciform parachute (for example, modified cruciform parachute 200, 300, 400, and/or 500) is configured with one or more corner panels. By utilizing corner panels, a modified cruciform parachute configured in accordance with principles of the present disclosure is configured to reduce canopy entanglements and increase the effective drag area of the parachute.

In prior cruciform parachutes, there is an opening, a gap, between adjacent sides of typical cruciform parachute canopies, and the shape of that gap is primarily affected by two forces. One of those forces is internal positive pressure that results from the parachute being pulled through the atmosphere. This internal pressure tends to push the lower region of the parachute canopy outward, relative to the parachute longitudinal centerline. The other force is the tendency for the suspension members, which converge at a single point beneath the parachute canopy, to pull the lower region of the parachute canopy inward, toward the parachute's longitudinal centerline. With the parachute moving through the atmosphere at a steady rate, the outward positive pressure and the inward pull of the suspension members will reach a general state of equilibrium. When that occurs, the gap between the canopy sides will assume a specific shape in accordance with the ratio of outward force to inward force. Rate of movement through the atmosphere will affect the internal pressure of the canopy and, therefore, the amount of outward force. The length of suspension members will affect inward force, with short suspension members causing more inward force than do long suspension members. However, other forces, such as air turbulence, can momentarily alter the balance between the inward and outward forces and, therefore, momentarily affect the precise shape of the gap between adjacent canopy sides.

Regardless of the precise shape of the opening between canopy sides, the openings are undesirable because they can lead to entanglements during the somewhat chaotic parachute deployment phase, and they can cause the parachute canopy to become somewhat rotor-like, causing the canopy to spin. Some prior parachute designers, such as the Puskas and Berland references discussed hereinabove, chose to simply join adjacent sides to one another and eliminate the gap. While the technique of closing the gap between adjacent sides by just securing the sides together reduces entanglements, it also has disadvantages, mainly that of reducing the circumference of the parachute canopy and, therefore, its effective drag area.

In contrast, in accordance with principles of the present disclosure, modified cruciform parachutes are configured with a plurality of corner panels (for example, corner panel 240, 340, 440 and/or 540). In various exemplary embodiments, a corner panel, for example corner panel 240, is configured with a shape resembling a truncated vesica piscis, with a selected width-to-height ratio influenced at least in part by the ratio of inward and outward forces anticipated to be acting on the parachute canopy.

In contrast to prior approaches that eliminated the gap between parachute sides by joining the sides, corner panel 240 eliminates the disadvantages of a gap between adjacent sides and, beneficially, does not reduce the canopy's effective drag area; rather, via use of corner panel 240, modified cruciform parachute 200 achieves increased effective drag area. It will be appreciated that a variety of shapes may be utilized for corner panel 240 (and/or corner panels 340, 440 and/or 540). In various exemplary embodiments, corner panel 240 is configured as a truncated vesica piscis in order to maximize the effective drag area of modified cruciform parachute 200. In certain exemplary embodiments, above the widest portion of corner panel 240, corner panel 240 is configured with an arc having a radius between about the width of center panel 210 and the diagonal dimension of center panel 210. In these exemplary embodiments, below the widest portion of corner panel 240, corner panel 240 is configured with an arc having a radius up to about 15% smaller than the radius of the arc above the widest portion of corner panel 240.

Figure 2C:
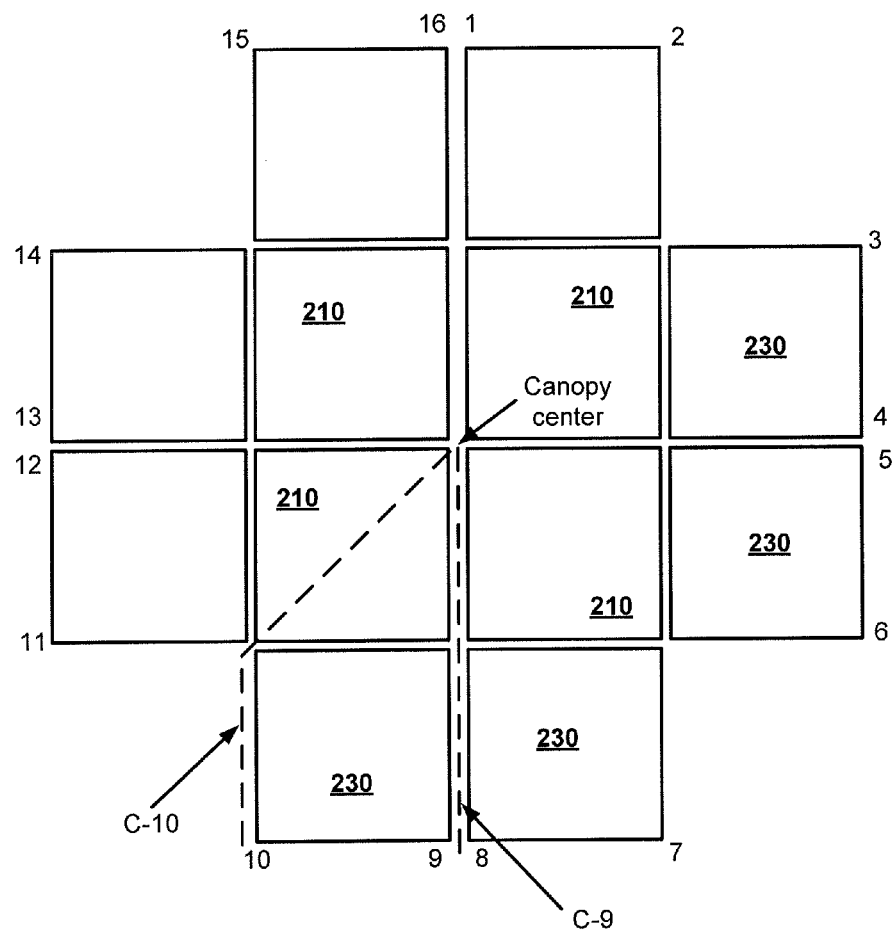
FIGS. 2C through 2E illustrate exemplary load paths in a modified cruciform parachute in accordance with an exemplary embodiment.

With reference now to FIG. 2C, force distribution in a cruciform parachute is illustrated. It is known that simple cruciform parachutes are not as efficient at force distribution as radiating gore parachutes. Even though cruciform parachute canopies have no true radial structural members, the force distribution within the canopy becomes radial because the suspension members of the parachute converge at a single point (beneath the canopy center). Force is thus distributed to discrete points around the canopy skirt (for example, illustrated as locations 1-16 in FIG. 2C).

In the example cruciform parachute illustrated in FIG. 2C, the canopy is divided into eight equally loaded segments, with each segment consisting of a triangular portion of a center panel 210 and a corresponding side panel 230. Each segment has two load paths from the skirt to the canopy center. However, the load paths are not of equal length; consequently, the shorter paths are more heavily loaded than the longer paths. For example, load path C-9 (extending from the canopy center to location 9) is shorter than load path C-10 (extending from the canopy center to location 10), even though both load path C-9 and C-10 are associated with a common parachute segment. This unequal distribution of load forces is undesirable, particularly during initial parachute inflation when aerodynamic forces are highest. It will be appreciated that unequal load distribution causes some parts of a parachute canopy to experience higher forces than other parts and, therefore, the parts exposed to the higher forces become more susceptible to failure than do other parts. Unfortunately, failures in one part of a canopy can force other parts of the canopy to face unplanned forces, which can lead to progressive failures.

Figure 2E:
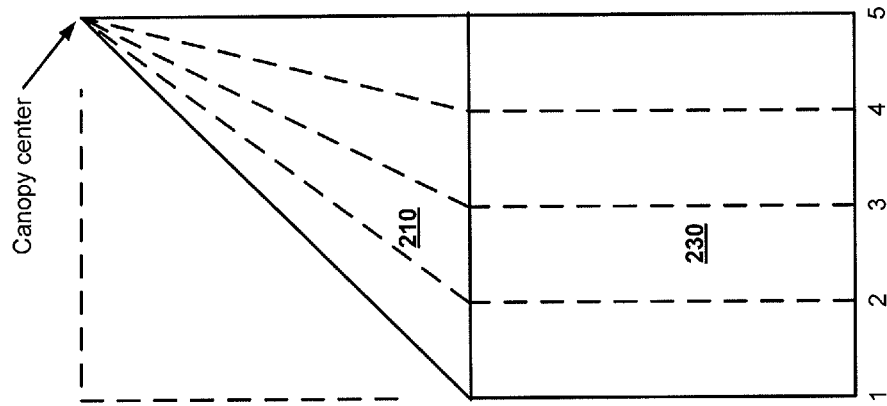
Figure 2D:
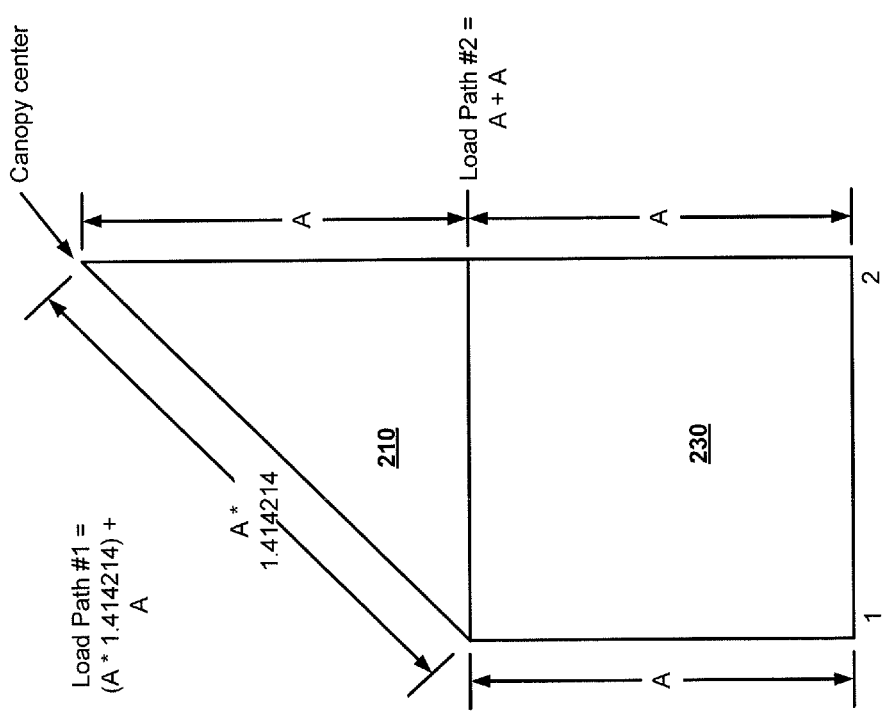
Figure 3A:
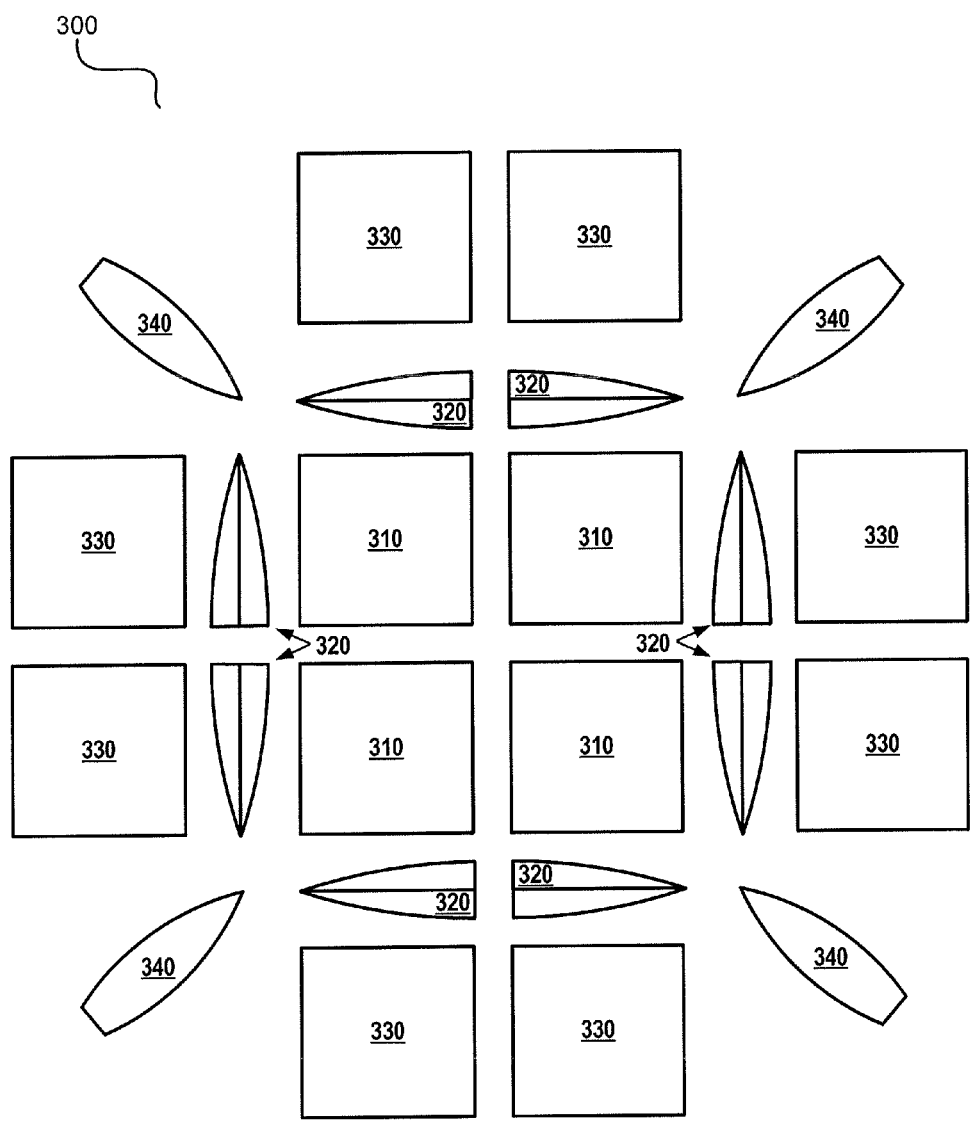
FIG. 3A illustrates exemplary components of a modified cruciform parachute in accordance with an exemplary embodiment.
Figure 3B:
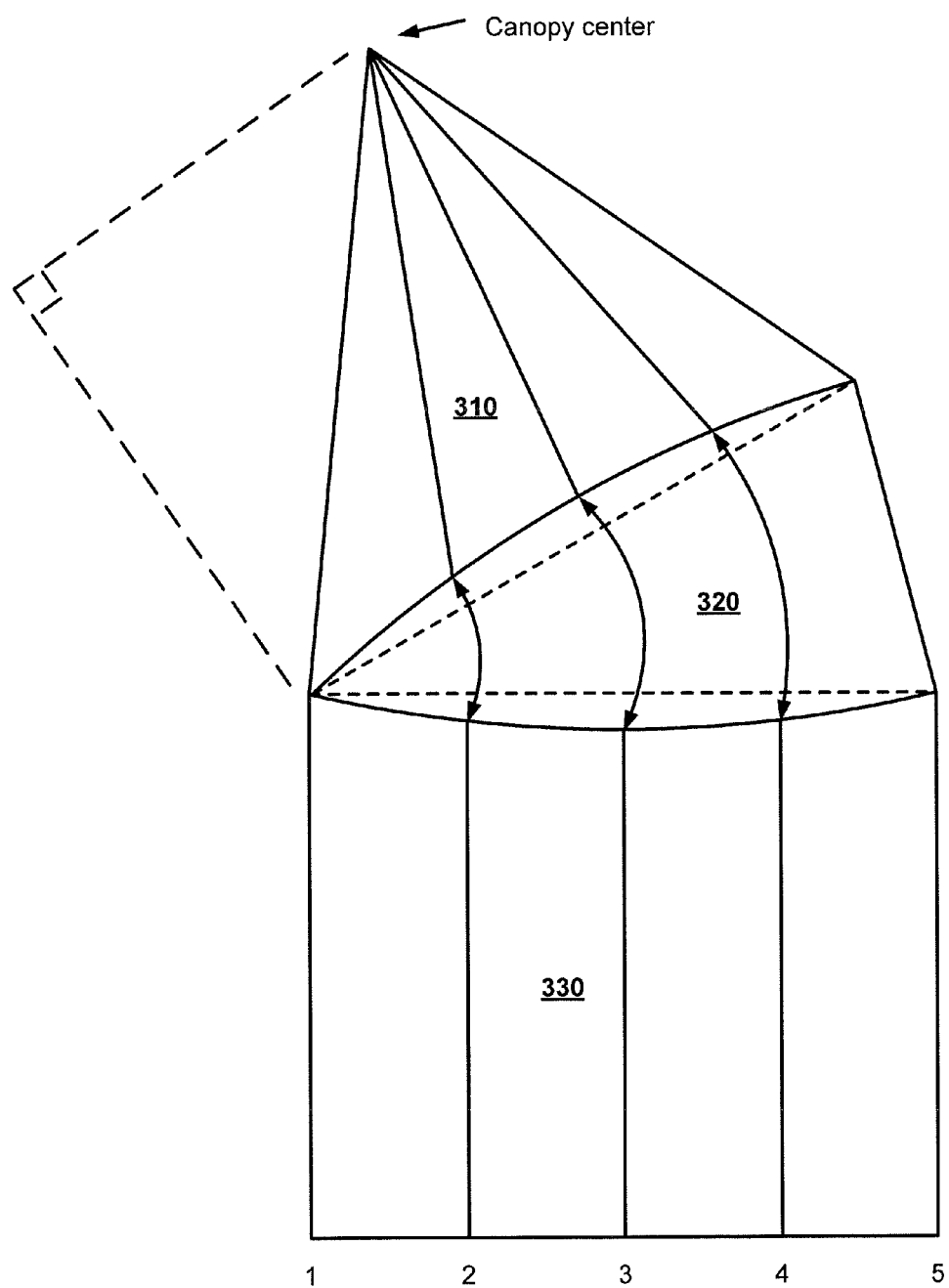
FIG. 3B illustrates exemplary load paths in a modified cruciform parachute in accordance with an exemplary embodiment.
Figure 3C:
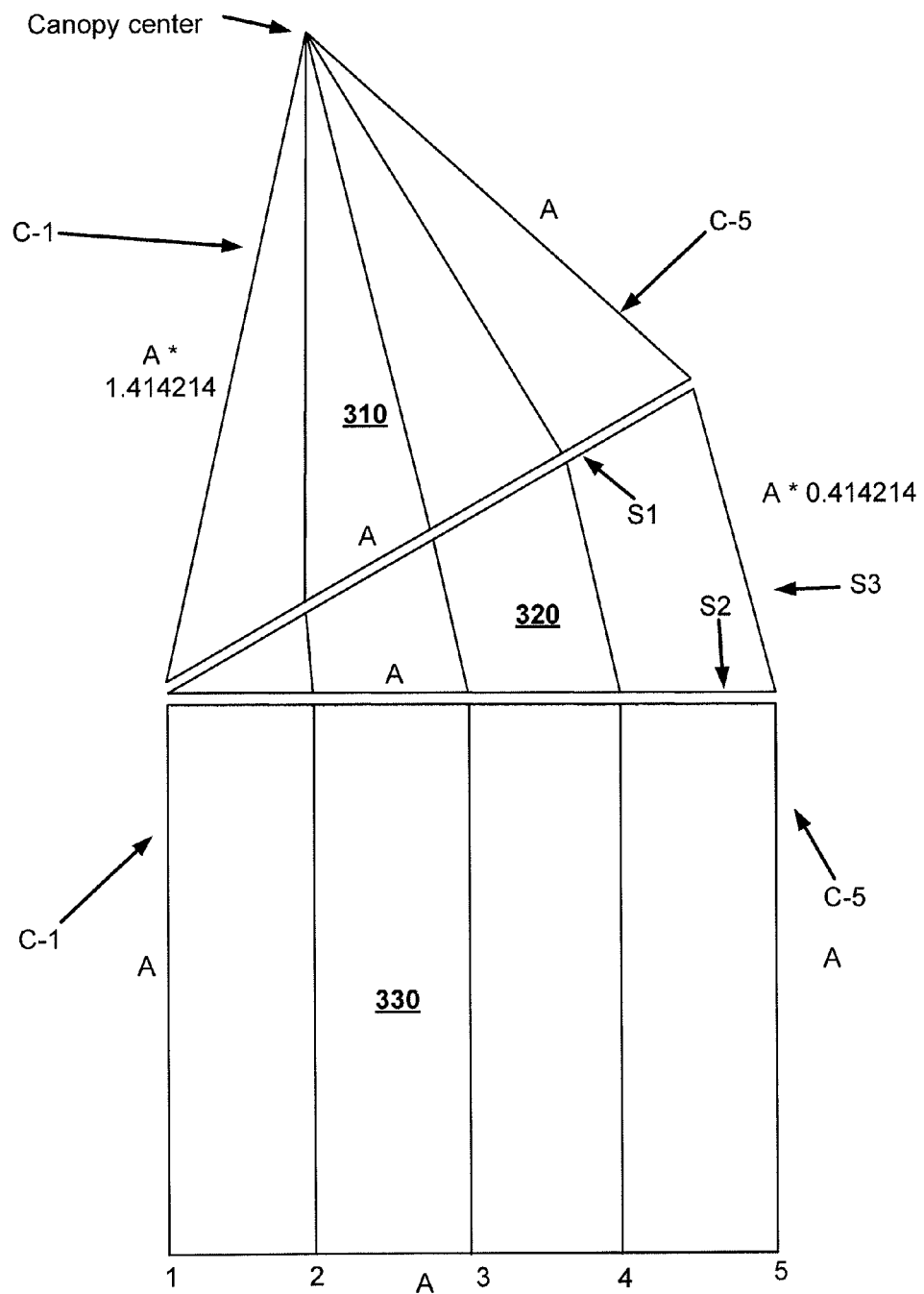
FIG. 3C illustrates exemplary equalized load paths in a modified cruciform parachute in accordance with an exemplary embodiment.
Figure 3D:
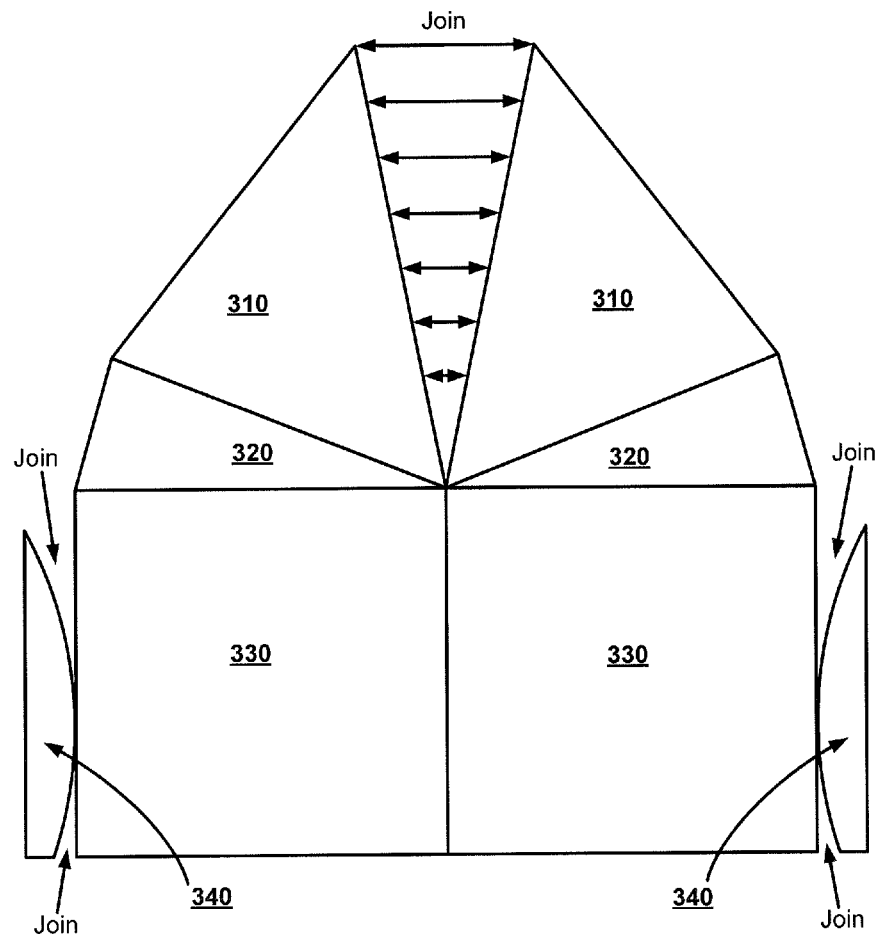
FIG. 3D illustrates coupling of exemplary components of a modified cruciform parachute to approximate a portion of a hemispherical shape in accordance with an exemplary embodiment.

Turning now to FIGS. 2D and 2E, differences in load path length are illustrated. FIG. 2D illustrates the length difference arising when a load path travels diagonally across center panel 210. FIG. 2E illustrates a series of five load paths, as if five suspension lines were attached to the illustrated parachute segment. The load path from canopy center to location 1 is the longest; the load path from canopy center to location 5 is the shortest. Consequently, each of these load paths are exposed to differing forces during parachute operation, with load path 1 being exposed to far less load than load path 5. This unequal distribution of load forces is undesirable, particularly during initial parachute inflation when aerodynamic forces are highest.

Accordingly, principles of the present disclosure contemplate modified cruciform parachutes having load paths of equal lengths (and/or load paths having reduced differences in length), in order to more equally distribute forces within the parachute. In various exemplary embodiments, modified cruciform parachutes configured in accordance with principles of the present disclosure utilize shoulder panels, for example in order to reduce and/or eliminate differences in load path lengths.

Turning now to FIGS. 3A through 3D, in various exemplary embodiments a modified cruciform parachute 300 is configured with a center panel 310, side panels 330, corner panels 340, and with a plurality of shoulder panels 320. Shoulder panels 320 may be configured to equalize (or reduce inequality between) load lengths in modified cruciform parachute 300. Shoulder panel 320 comprises a suitable material, for example a textile and/or film, such as nylon, mylar, and/or the like. In modified cruciform parachute 300, shoulder panel 320 may comprise a similar material to other panels, for example center panel 310; moreover, shoulder panel 320 may comprise different materials than other panels, for example in order to achieve a desired strength, flexibility, and/or the like. Shoulder panel 320 may be triangular, tapered, and/or the like, as desired. Shoulder panel 320 may be monolithic; alternatively, shoulder panel 320 may be comprised of sub-panels. Stated another way, shoulder panel 320 may be comprised of multiple shoulder panels 320.

In contrast to prior approaches that utilized three-dimensional portions to link center panels and side panels, in modified cruciform parachute 300, shoulder panels 320 are flat (i.e., two-dimensional). Because shoulder panels 320 are flat, construction costs and complexity are significantly reduced. Additionally, as compared to prior three-dimensional portions, shoulder panels 320 allow modified cruciform parachute 300 to assume a more hemispherical shape when inflated as compared to prior cruciform parachutes. Yet further, in various exemplary embodiments, modified cruciform parachute 300 is configured to achieve an inflated diameter that is approximately equal to the constructed diameter. In this manner, modified cruciform parachute 300 achieves improved force distribution and aerodynamic efficiency while utilizing less complex component shapes.

In modified cruciform parachute 300, when center panel 310 and side panel 330 are each configured as squares having length A, shoulder panel 320 may be configured as an isosceles triangle having two sides of length A and a third side of length 0.414214*A (i.e., a third side of length $(\sqrt{2}-1)$*A). When center panel 310, shoulder panel 320, and side panel 330 are coupled together as illustrated, it can be seen that load path C-1 (from the canopy center to location 1) has a length of 1.414214*A (traversing center panel 310)+A (traversing side panel 330)=2.414214 A. At the other side of side panel 330, load path C-5 (from the canopy center to location 5) has a length of A (traversing center panel 310)+0.414214*A (traversing shoulder panel 320)+A (traversing side panel 330)=2.414214 A. Load paths C-2, C-3, and C-4 are also configured with the same length of 2.414214 A. By providing equal load lengths in modified cruciform parachute 300, shoulder panel 320 allows for more even force distribution in modified cruciform parachute 300 and consequently, reduced parachute failure.

In various exemplary embodiments, shoulder panel 320 is configured as an isosceles triangle; the sides of equal length (S1 and S2) are coupled to center panel 310 and side panel 330, respectively. In an exemplary embodiment, the remaining side S3 is configured with a length of $(\sqrt{2}-1)$*the length of S1 or S2). In various exemplary embodiments, the remaining side S3 is configured with a length of between $((\sqrt{2}-1)$*2*the length of S1 or S2) and $((\sqrt{2}-1)$*0*the length of S1 or S2). Stated another way, side S3 may be configured with a length+/−100% of $((\sqrt{2}-1)$*the length of S1 or S2). In this manner, the dimensions of shoulder panel 320 may be varied in order to achieve one or more desired characteristics of modified cruciform parachute 300, for example aerodynamic efficiency under particular loading conditions, construction expense, and/or the like. In various other embodiments, shoulder panel 320 may be omitted from modified cruciform parachute 300, (i.e., when side S3 is selected to have zero length).

In various exemplary embodiments, modified cruciform parachute 300 is configured as a modular design. Stated another way, various elements of modified cruciform parachute 300 may be equivalent and/or interchangeable (for example, center panel 310 and side panel 330), allowing modified cruciform parachute 300 to be created and/or repaired using preformed panels.

In various exemplary embodiments, modified cruciform parachute 300 is constructed via complete joining of the component panels along the corresponding edges. In other exemplary embodiments, modified cruciform parachute 300 is constructed by joining the component panels only at discrete points. In yet other exemplary embodiments, modified cruciform parachute 300 is constructed via complete joining of certain panels, and partial joining of certain other panels. In this manner, the geometric porosity of modified cruciform parachute 300 may be adjusted to the needs of a particular application. For example, a fully joined embodiment may be suitable for instances of low dynamic pressure, while a discretely joined embodiment may be suitable for instances of high dynamic pressure.

Additionally, in certain exemplary embodiments modified cruciform parachute 300 is at least partially configured with (i) joining means (i.e., ties, stitching, and/or the like) that are sufficiently strong to stay intact at high dynamic pressure (i.e., intended to be non-frangible), and/or (ii) joining means (i.e., ties, stitching, and/or the like) that are frangible at high dynamic pressure. The non-frangible joining means and/or the frangible joining means may also be elastic, as desired. In this manner, modified cruciform parachute 300 may be configured to be "self-adjustable"; the canopy would be of low geometric porosity when exposed to low dynamic pressure, preventing most ingested air from passing through and thus decreasing inflation time. However, if sufficiently high dynamic pressure is encountered by modified cruciform parachute 300, one or more of the frangible joining means would fail (and/or the frangible or non-frangible joining means may stretch), thus increasing the geometric porosity, allowing a controlled amount of ingested air to pass through the canopy, and increasing the inflation time. In this manner, modified cruciform parachute 300 may adapt to relieve canopy stress and decrease canopy damage that might otherwise occur at high dynamic pressure.

Figure 4A:
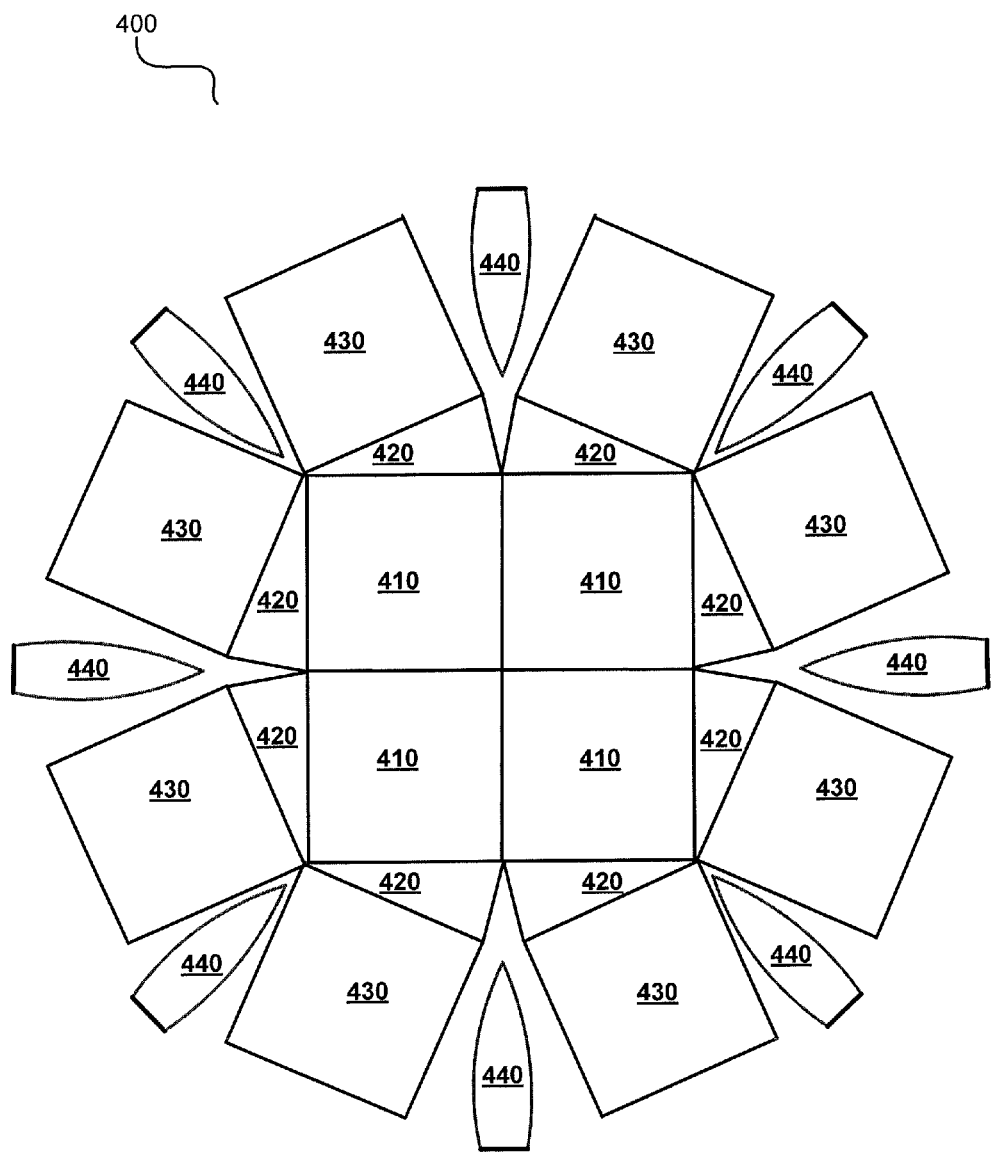
FIG. 4A illustrates exemplary components of a modified cruciform parachute in accordance with an exemplary embodiment.
Figure 4B:
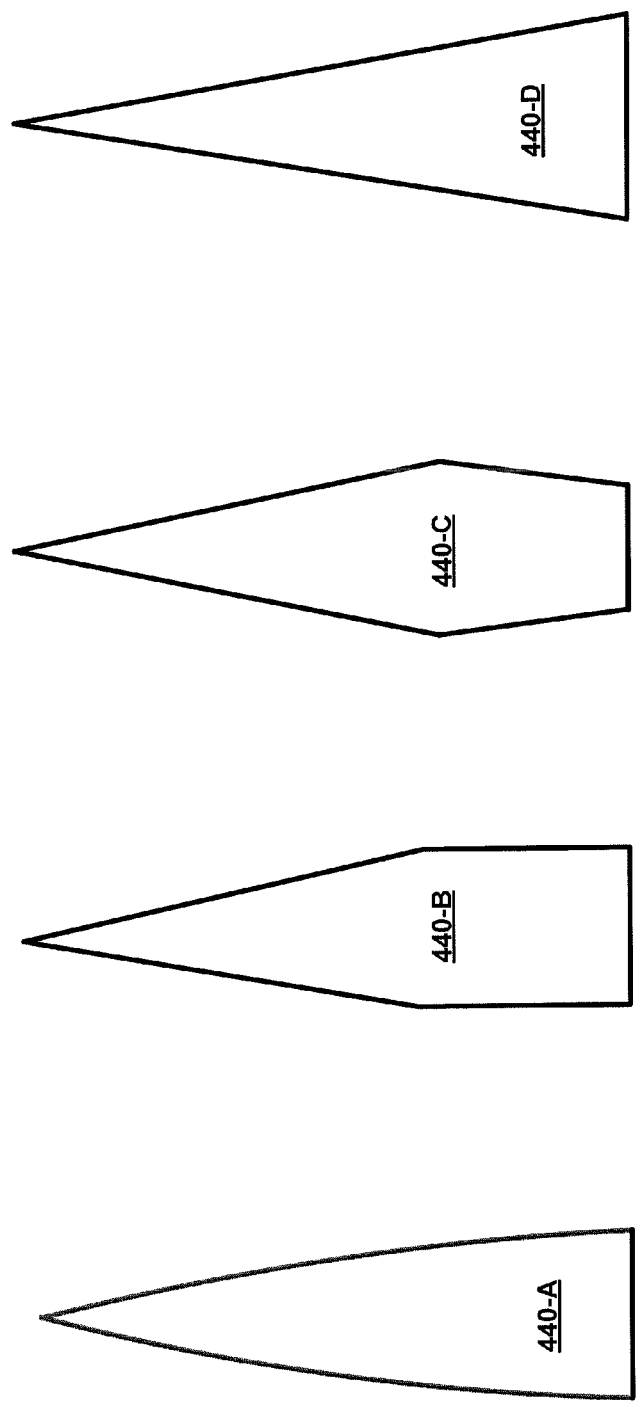
FIG. 4B illustrates exemplary configurations of components of a modified cruciform parachute in accordance with an exemplary embodiment.

Turning now to FIGS. 4A and 4B, in various exemplary embodiments a cruciform parachute, for example modified cruciform parachute 400, may be configured to more closely resemble a hemispherical shape when inflated. In an exemplary embodiment, modified cruciform parachute 400 comprises four center panels 410 and eight side panels 430, with a shoulder panel 420 disposed between corresponding center panels 410 and side panels 430 as illustrated in FIG. 4A. Additionally, in this exemplary embodiment modified cruciform parachute 400 is configured with eight corner panels 440, for example disposed approximately every 45 degrees about the canopy edge. In various exemplary embodiments, and with reference to FIG. 4B, corner panels 440 may be tapered (i.e., having a shape similar to a truncated vesica piscis, similar to corner panel 440-A), pointed (i.e., shaped like a triangle mated to a square or rectangle, similar to corner panel 440-B, or shaped like a triangle mated to a trapezoid, similar to corner panel 440-C), triangular (i.e., similar to corner panel 440-D), and/or combinations of the same. In various exemplary embodiments, in modified cruciform parachute 400, every panel comprises a flat (i.e., two-dimensional) piece of material. In various exemplary embodiments, modified cruciform parachute 400 may configured with additional and/or fewer center panels 410, side panels 430, shoulder panels 420, and/or corner panels 440.

Figure 4C:
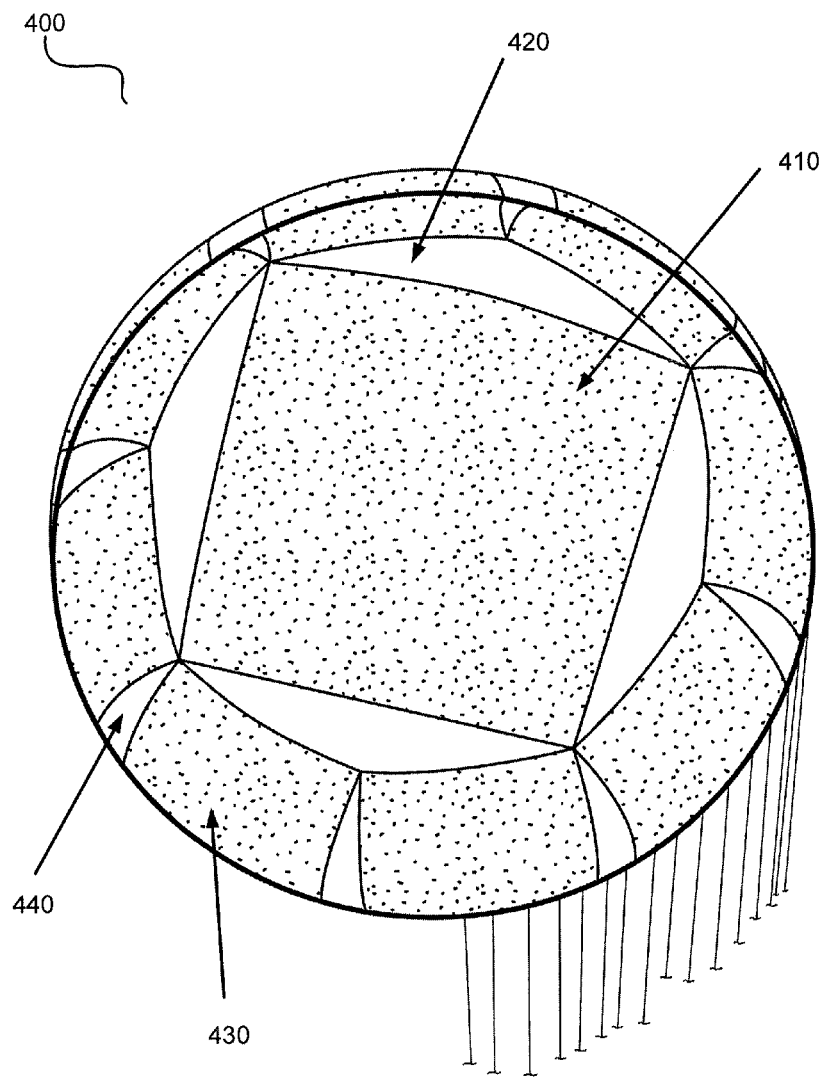
FIG. 4C illustrates an exemplary modified cruciform parachute in accordance with an exemplary embodiment, illustrated inflated to show a substantially circular skirt.

With momentary reference now to FIG. 4C, in various exemplary embodiments a modified cruciform parachute 400 is illustrated in an airstream, showing that the skirt of modified cruciform parachute 400 may be configured to be substantially circular via use of shoulder panels 420 and corner panels 440. In FIG. 4C, for clarity of illustration it will be appreciated that only a subset of the suspension lines for modified cruciform parachute 400 are shown, and that in actuality modified cruciform parachute 400 is usable in connection with suspension lines distributed along the entire parachute skirt.

With reference now to FIGS. 5A through 5D, in various exemplary embodiments a modified cruciform parachute 500 is configured with center panels 510, side panels 530, corner panels 540, and with a plurality of peripheral panels 520. Center panels 510 may be identical to side panels 530, as previously disclosed. Moreover, as compared to shoulder panels 320, which are disposed between center panels 310 and side panels 330, peripheral panels 520 are disposed adjacent to side panels 530 on the side opposite center panels 510. Peripheral panels 520 form at least a portion of the skirt of modified cruciform parachute 500. Peripheral panels 520 may be configured to equalize (or reduce inequality between) load lengths in modified cruciform parachute 500.

Peripheral panel 520 comprises a suitable material, for example a textile and/or film, such as nylon, mylar, and/or the like. In modified cruciform parachute 500, peripheral panels 520 may comprise a similar material to other panels, for example center panel 510; moreover, peripheral panel 520 may comprise different materials than other panels, for example in order to achieve a desired strength, flexibility, and/or the like. Peripheral panel 520 may be triangular, tapered, and/or the like, as desired. Peripheral panel 520 may be monolithic; alternatively, peripheral panel 520 may be comprised of sub-panels. Stated another way, peripheral panel 520 may be comprised of multiple peripheral panels 520.

In various exemplary embodiments, in modified cruciform parachute 500, peripheral panels 520 are flat (i.e., two-dimensional). Because peripheral panels 520 are flat, construction costs and complexity are significantly reduced. Additionally, peripheral panels 520 allow modified cruciform parachute 500 to assume a more hemispherical shape when inflated as compared to prior cruciform parachutes lacking peripheral panels. Yet further, in various exemplary embodiments, modified cruciform parachute 500 is configured to achieve an inflated diameter that is approximately equal to the constructed diameter. In this manner, modified cruciform parachute 500 achieves improved force distribution and aerodynamic efficiency while utilizing less complex component shapes.

In modified cruciform parachute 500, when center panel 510 and side panel 530 are each configured as squares having length A, peripheral panel 520 may be configured as a right triangle having one side of length A and a second side of length 0.414214*A (i.e., a second side of length ($\sqrt{2}-1$)*A). When center panel 510, side panel 530, and peripheral panel 520 are coupled together as illustrated in FIG. 5D, it can be seen that load path L-1 (from the canopy center to location 1) has a length of 1.414214*A (traversing center panel 510)+A (traversing side panel 530)=2.414214 A. At the other side of side panel 530, load path L-7 (from the canopy center to location 7) has a length of A (traversing center panel 510)+A (traversing side panel 530)+0.414214*A (traversing peripheral panel 520)=2.414214 A. Load paths L-2 through L-6 are also configured with the same length of 2.414214 A. By providing equal load lengths in modified cruciform parachute 500, peripheral panel 520 allows for more even force distribution in modified cruciform parachute 500 and consequently, reduced parachute failure.

Figure 5A:
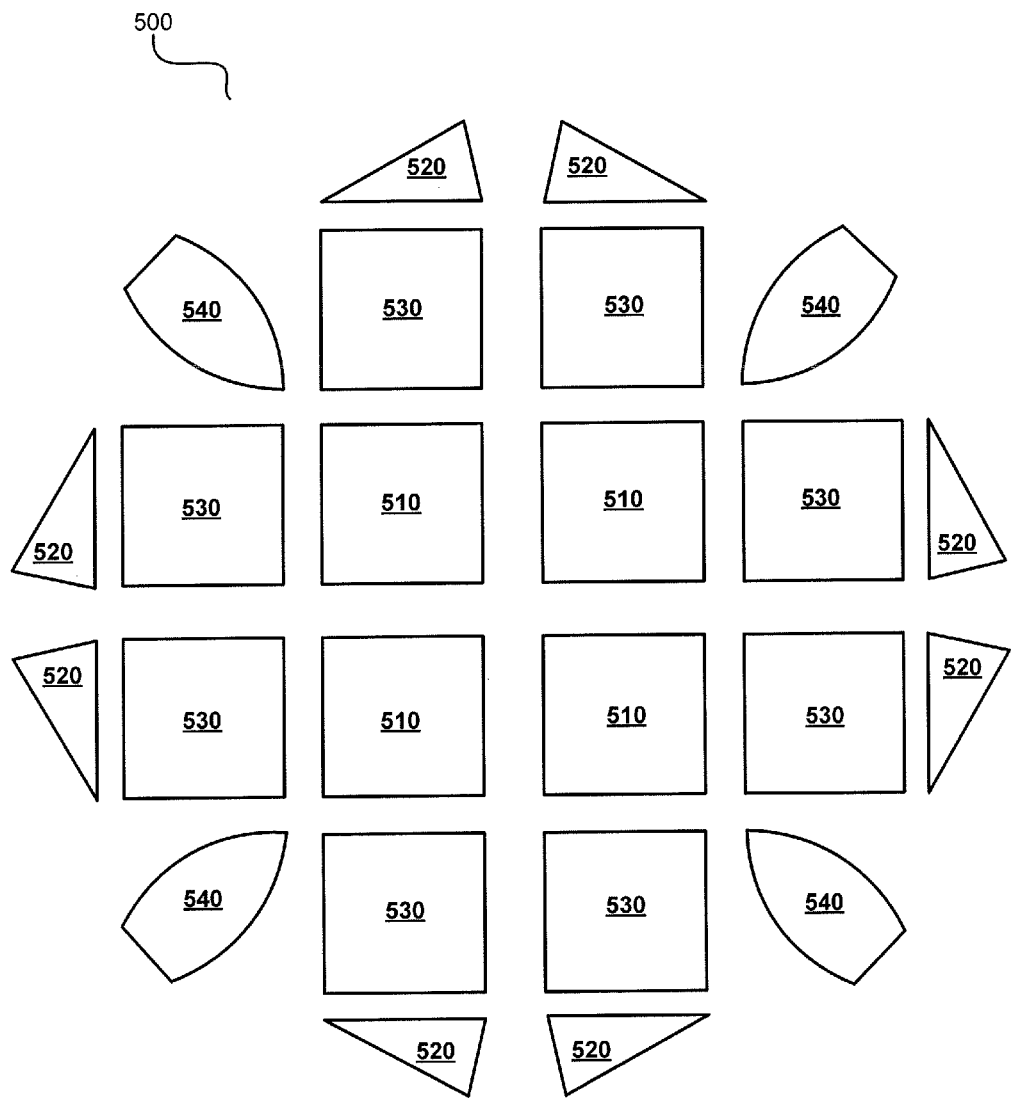
FIGS. 5A and 5B illustrate exemplary components of a modified cruciform parachute in accordance with an exemplary embodiment.
Figure 5B:
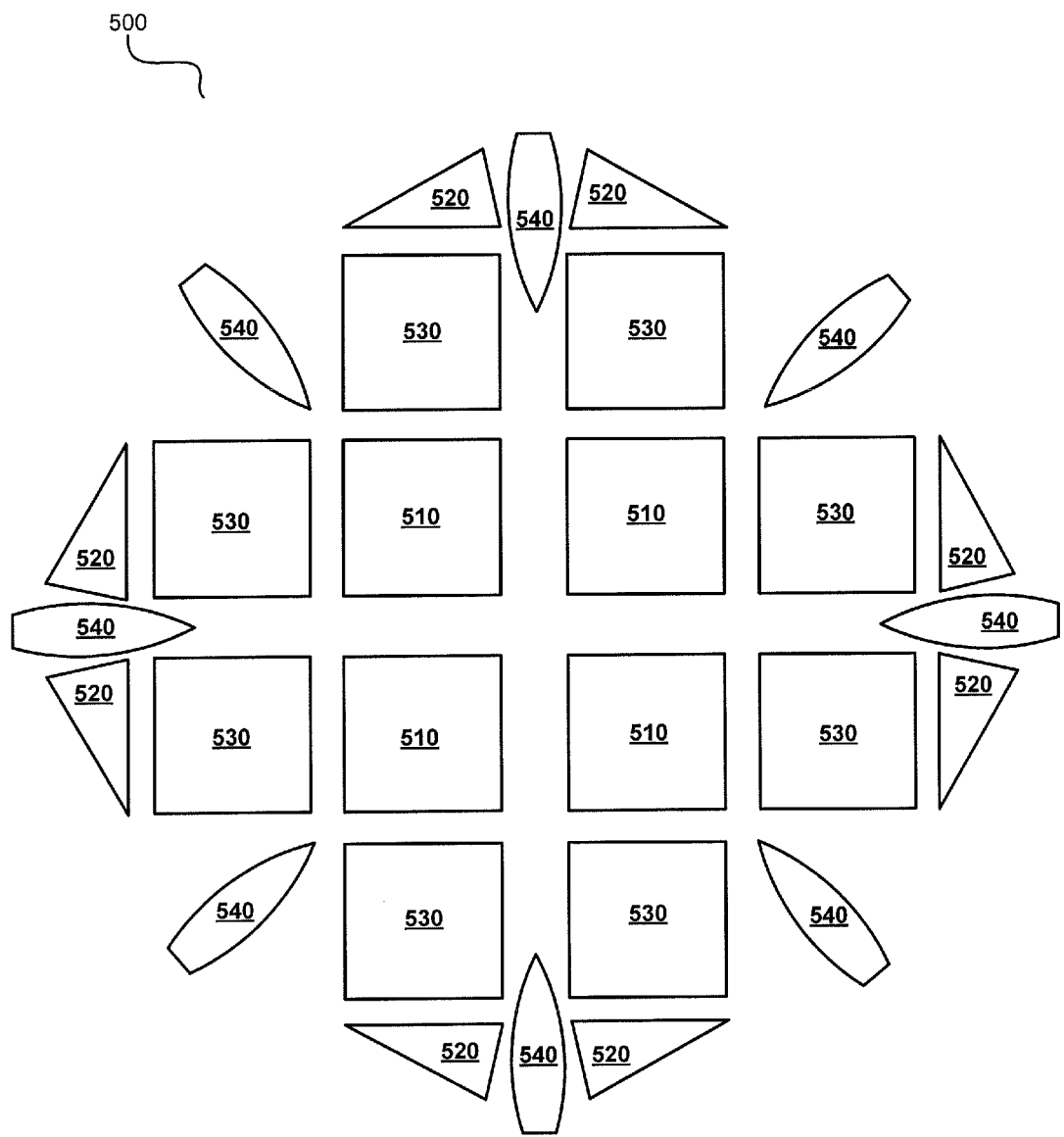
Figure 5C:
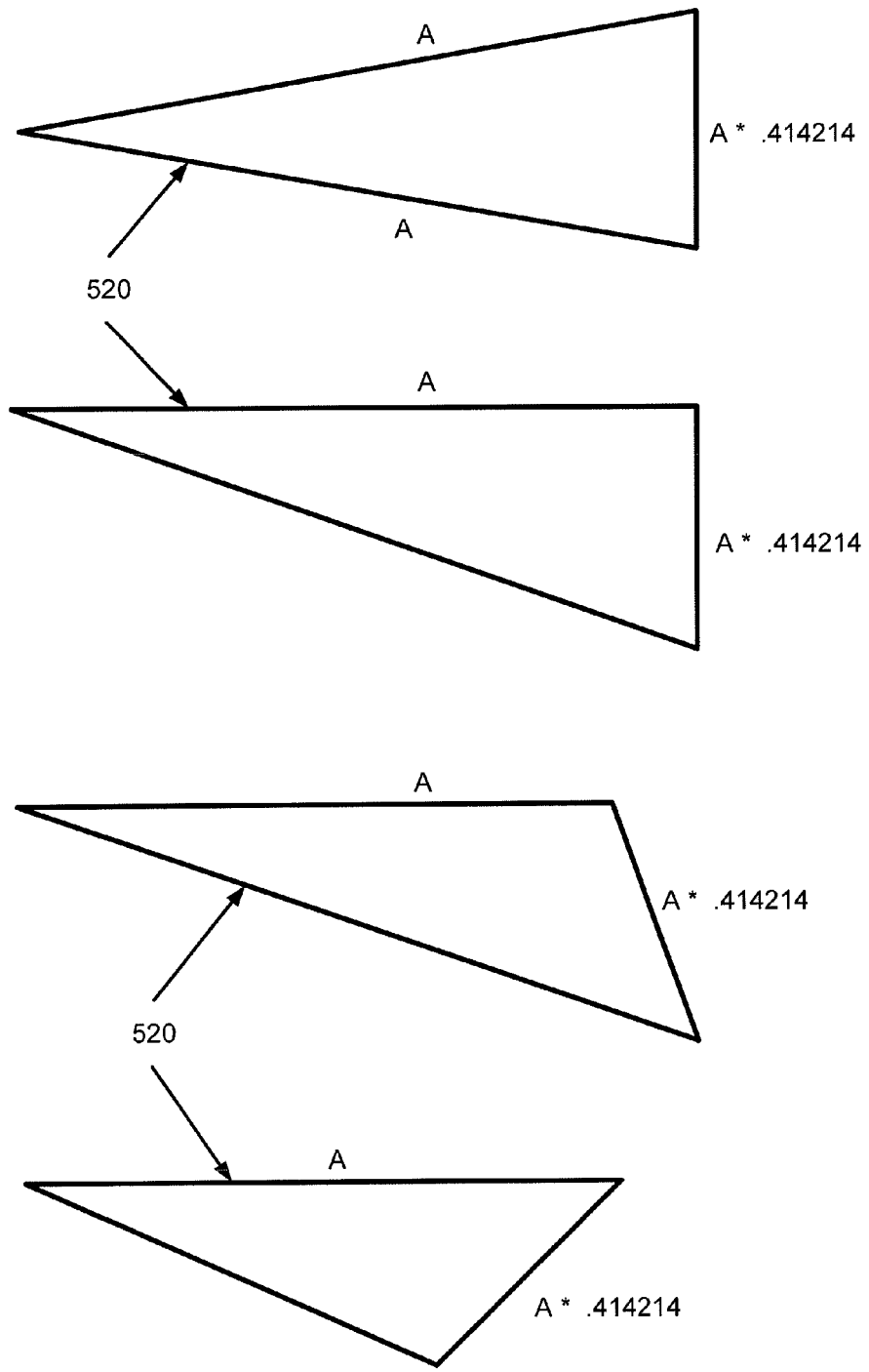
FIG. 5C illustrates exemplary configurations of components of a modified cruciform parachute in accordance with an exemplary embodiment.
Figure 5D:
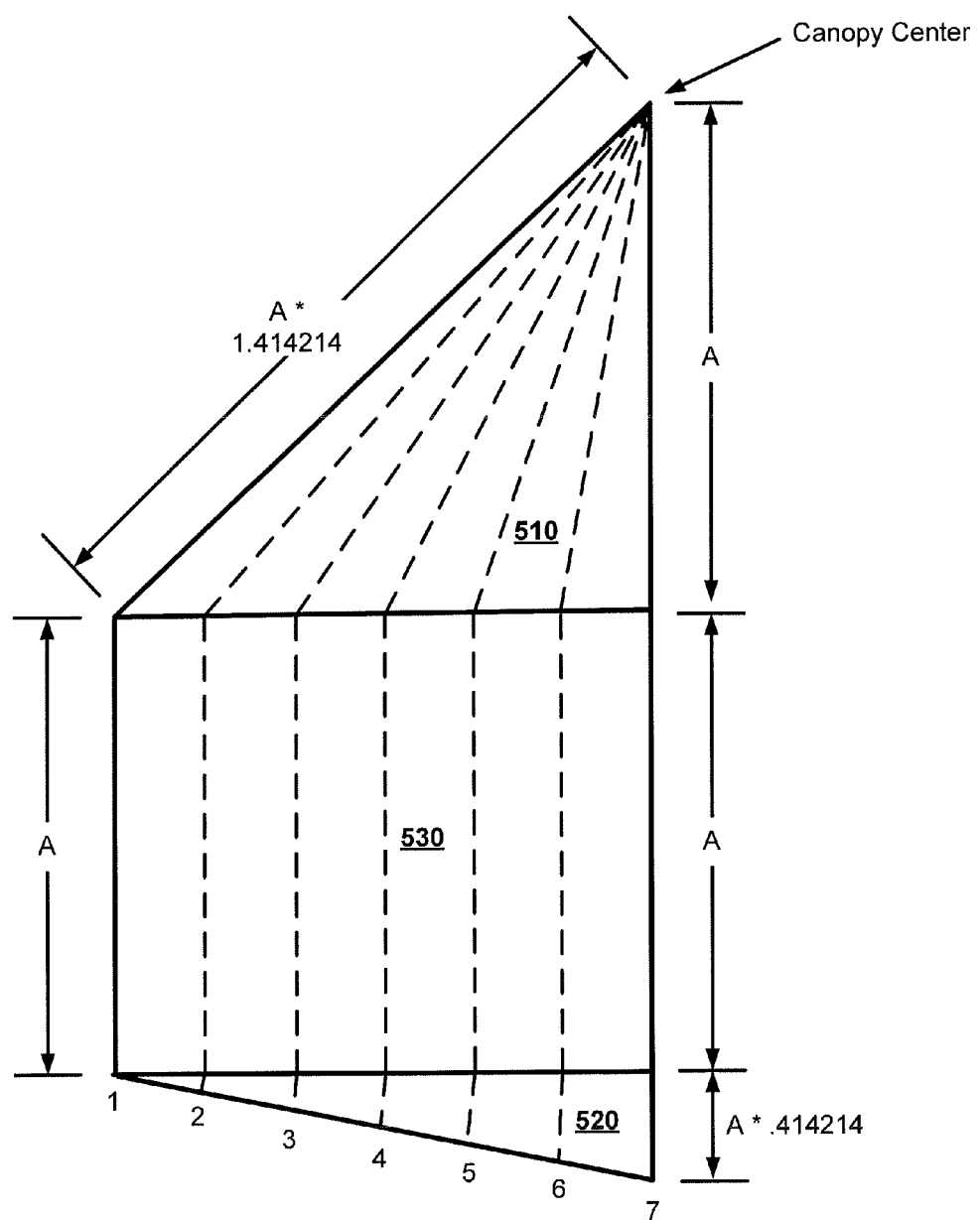
FIG. 5D illustrates exemplary configurations of components of a modified cruciform parachute in accordance with an exemplary embodiment.

With reference now to FIG. 5C, in various exemplary embodiments peripheral panel 520 is configured as an isosceles triangle, a right triangle, an obtuse scalene triangle, or an acute scalene triangle. The shape of peripheral panel 520 may be configured to equalize (or reduce inequality between) load paths in modified cruciform parachute 500. The shape of peripheral panel 520 may also be configured to cause modified cruciform parachute 500 to achieve a more hemispherical shape when inflated, increasing aerodynamic efficiency.

In addition to principles of parachute construction and use disclosed hereinabove, principles of the present disclosure contemplate steering capabilities for cruciform and/or hemispherical parachutes. Turning now to FIGS. 6A through 6D, in various exemplary embodiments, a parachute (for example, parachute 600) may be configured with increased gliding and/or steering capabilities as opposed to conventional parachutes.

Conventional parachutes having a roughly hemispherical canopy and minimal venting typically oscillate, relative to their longitudinal axis, as they descend through the atmosphere. "Oscillating", in this scenario, means the parachutes tilt first one way and then another as they descend. As the tilting occurs, more of the pressurized air inside the parachute canopy escapes from the high side of the canopy skirt than from the low side, pushing the parachute in the direction of the low side. Although limited in amount, this process is gliding. The direction of this sort of gliding is generally neutral because the direction of the oscillations is random and ever changing. Therefore, overall, such gliding in any one direction is generally cancelled out by subsequent gliding in another direction.

Prior approaches implemented controlled gliding of a hemispherical parachute via venting provisions to allow internal positive air to be vented out through the "rear" quadrant of the parachute in a controlled manner. This controlled venting is typically accomplished by altering the degree and/or duration of the canopy tilt, which is typically done by temporarily (and/or permanently) shortening the suspension members attached to a localized portion of the parachute canopy. However, this technique results in minimal glide, and provides no capability to rotate the parachute relative to its vertical axis, and it increases the rate of descent because the parachute is being pushed downward as it is being pushed horizontally.

In contrast, in accordance with principles of the present disclosure, in various exemplary embodiments a more effective controlled glide for a hemispherical or modified cruciform parachute 600 results from providing openings in the "rear" quadrant of the parachute, which allows internal pressurized air to escape the parachute canopy in the form of localized exhausting. In this manner, parachute 600 is glidable in the horizontal plane. Additionally, in various exemplary embodiments certain control provisions are incorporated that allow independent control for each side of the vented area. In this manner, parachute 600 can be made to rotate, relative to its longitudinal centerline. Now, parachute 600 can be made to traverse the air mass in which it is descending, either upwind, downwind, or crosswind. With this directional control, coupled with some amount of glide, parachute 600 can be caused to move relative to a specific track across the ground.

It will be appreciated that, if parachute 600 is caused to glide in the direction that is opposite of the air mass movement at landing, the horizontal impact velocity for landing will be decreased. For example, if the air mass is drifting south at 5 miles per hour and parachute 600 is gliding north at 5 miles per hour relative to the air mass, the horizontal impact velocity at landing will approach zero.

Figure 6A:
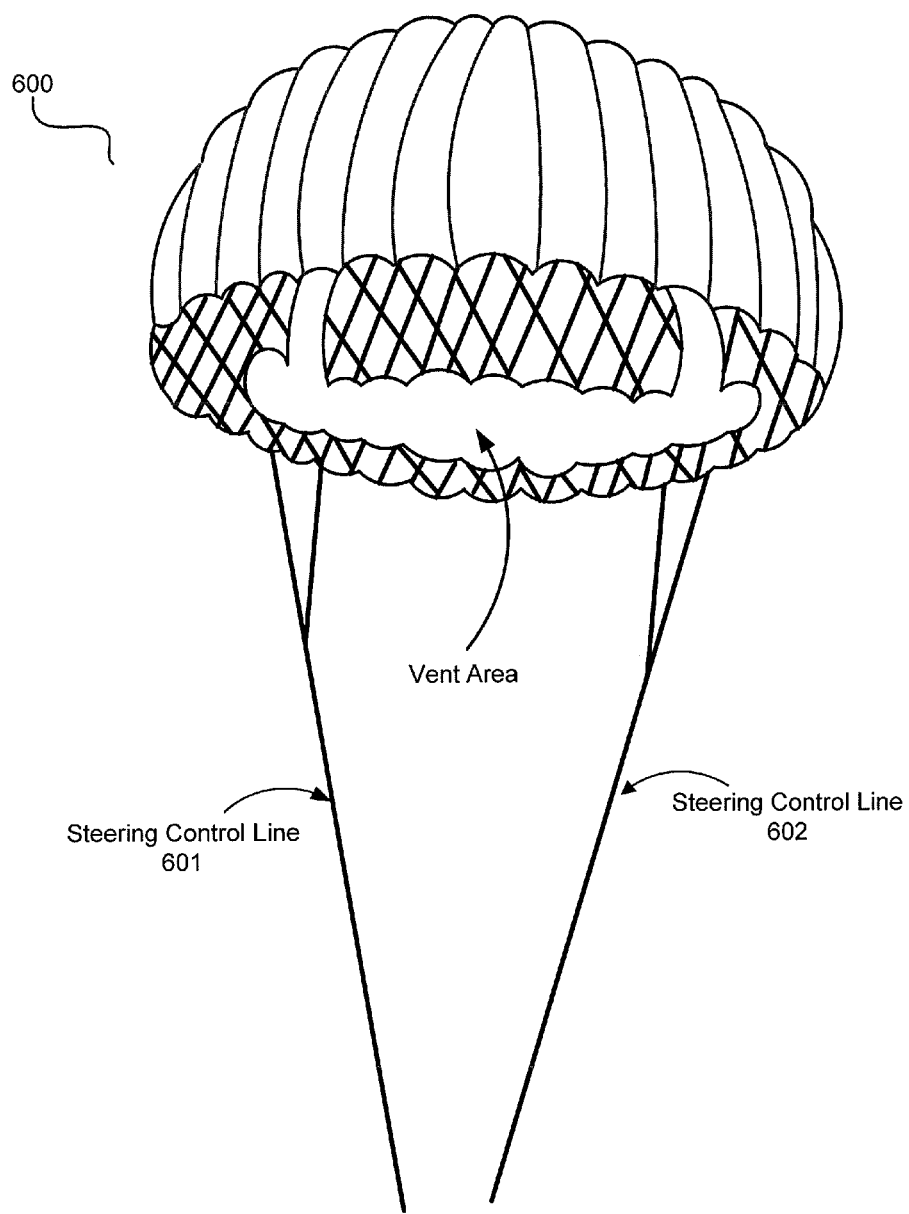
FIGS. 6A through 6D illustrate exemplary parachute steering components in accordance with an exemplary embodiment.

With reference now to FIG. 6A, in an exemplary embodiment parachute 600 is configured with simple openings incorporated in the rear portion of the parachute canopy, causing parachute 600 to tend to glide in the forward direction upon canopy inflation. In various exemplary embodiments, a first steering control line 601 (which may be branched) is attached near the openings on one side of the canopy. Parachute 600 may be caused to turn in one direction by applying tension to the steering control line. In certain exemplary embodiments, a second steering control line 602 is attached near the openings on the opposite side of the canopy, and parachute 600 may be caused to turn in the opposite direction by applying tension to this second steering control line.

In an exemplary embodiment, in this basic steering scenario, tension in either the first steering control line 601 or the second steering control line 602 distorts the canopy shape, which increases horizontal drag on one side and causes parachute 600 to turn in the direction of the increased drag.

Figure 6B:
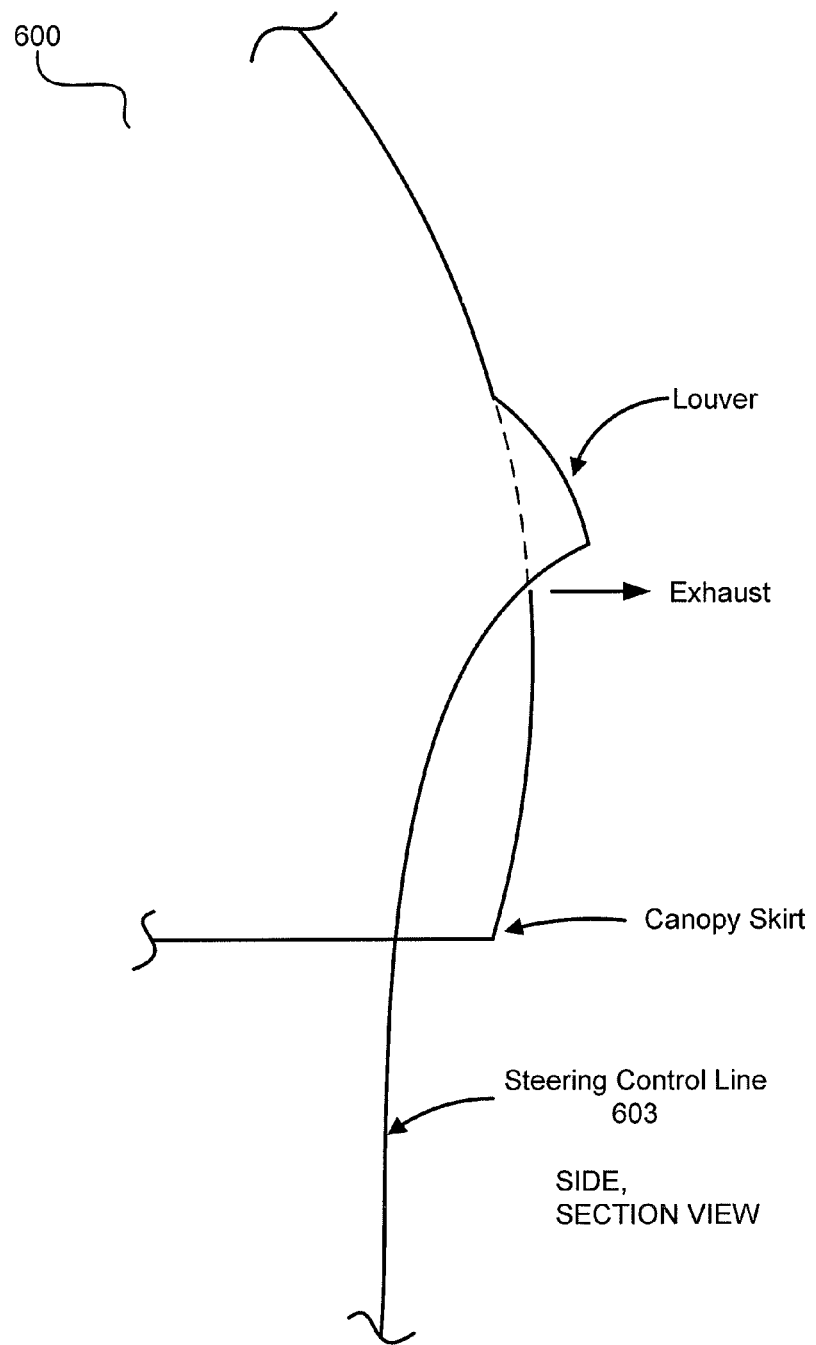

In various other exemplary embodiments, with reference now to FIG. 6B, parachute 600 is configured with a more sophisticated steering means, comprising incorporating flaps or louvers in some of the canopy openings. In these exemplary embodiments, a steering control line or lines 603 are connected to the edge of the louvers, and when steering control lines 603 are tensioned, the louvers will close as a result of steering control lines 603 being tensioned. Closing louvers requires much less energy to accomplish than does distorting the canopy of parachute 600. Tensioning one steering control line 603 results in a turn in one direction, and tensioning another steering control line 603 causes a turn in the opposite direction. If a reduced amount of glide is desired, in parachute 600 it can be accomplished by tensioning at least two steering control lines 603 simultaneously. It will be appreciated that venting/steering components as described herein may also be disposed at the front and/or rear of parachute 600 canopy, allowing parachute 600 to glide forward or rearward without substantial rotation about the vertical axis.

Figure 6C:
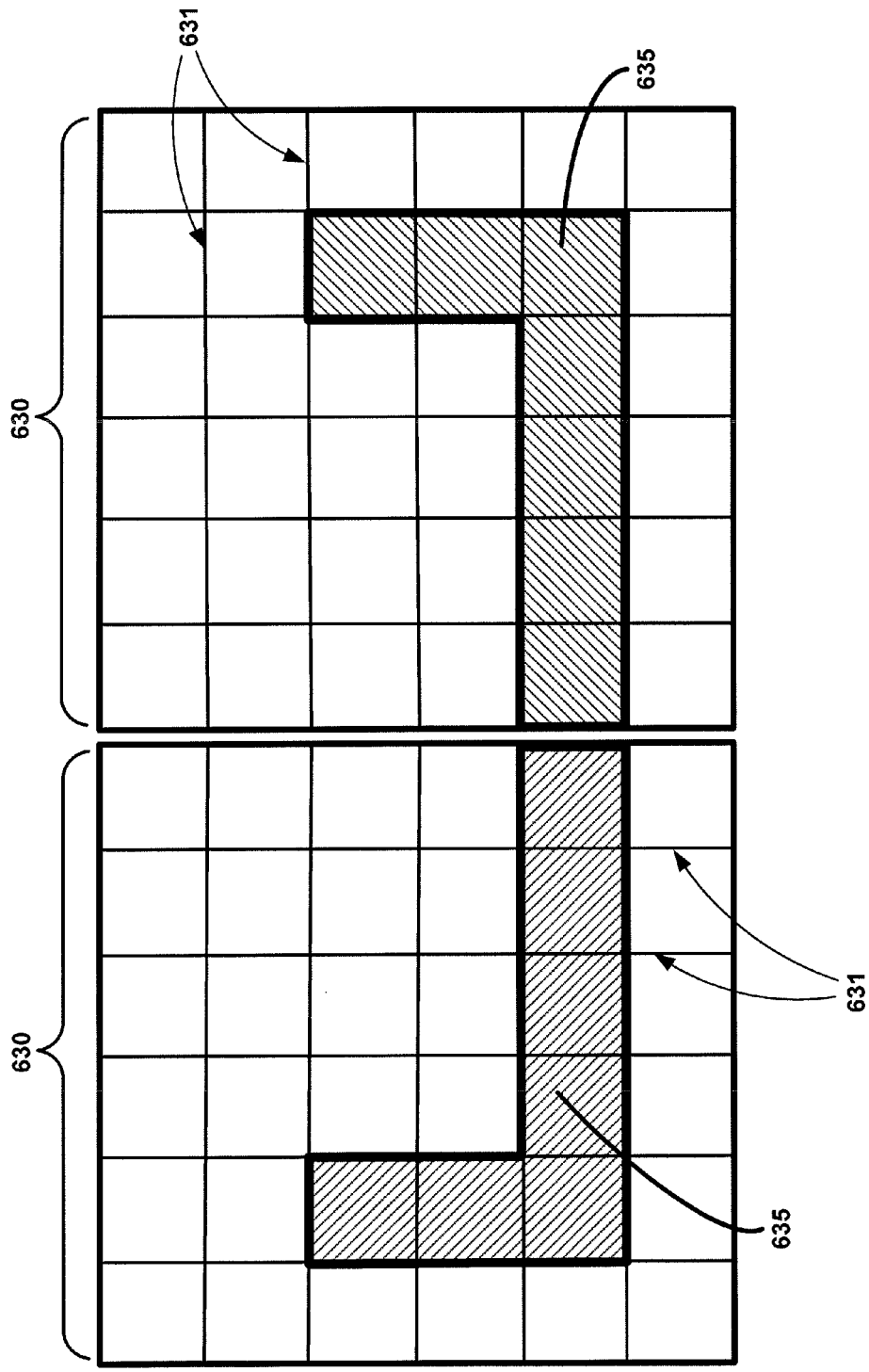
Figure 6D:
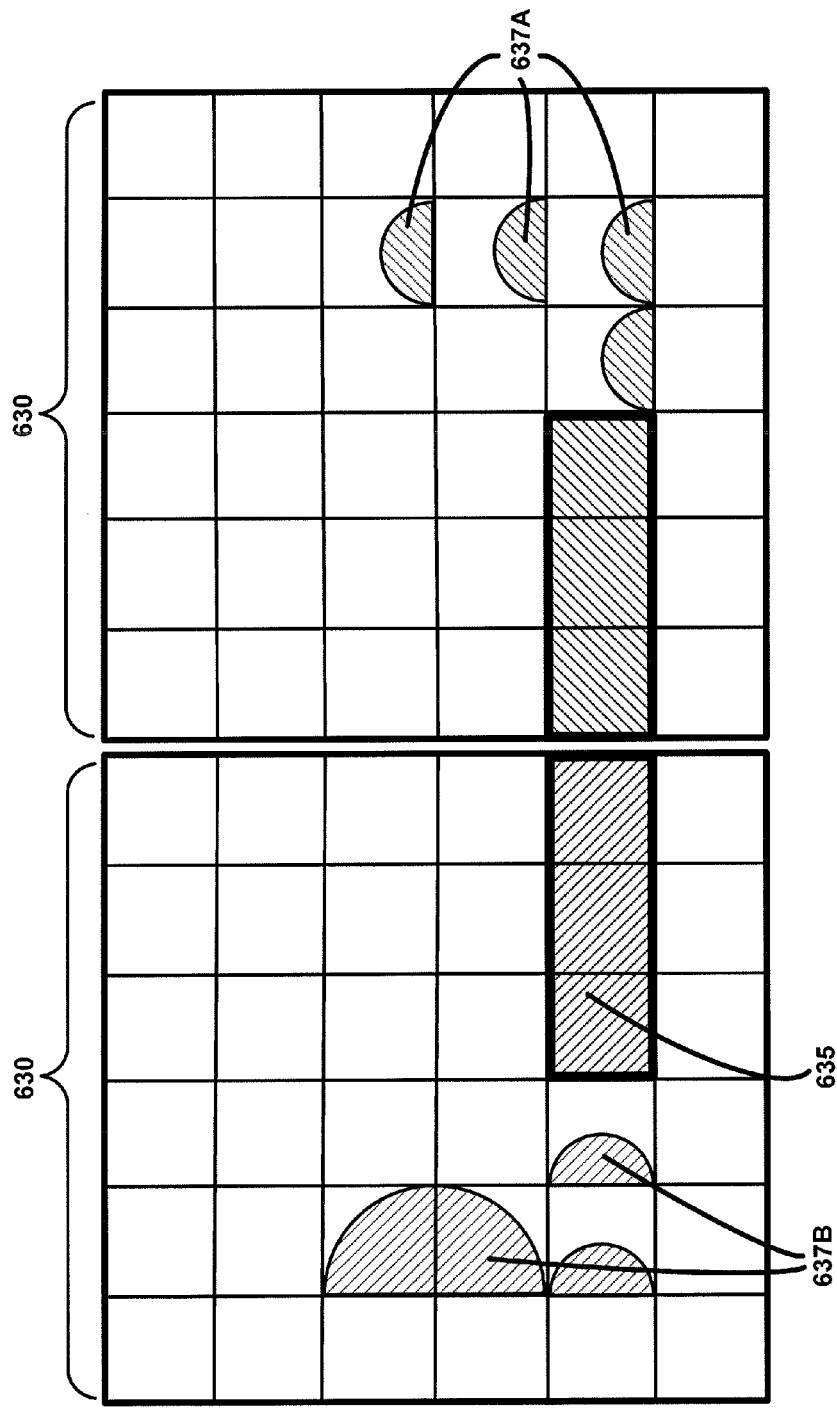

With reference now to FIGS. 6C and 6D, in various exemplary embodiments modified cruciform parachute 600 is configured with a plurality of side panels 630, each configured with a grid of reinforcing members 631. In at least one side panel 630 in modified cruciform parachute 600, an opening 635 may be disposed between, inside, and/or surrounded or overlaid by one or more reinforcing members 631. Openings 635 may be plain; moreover, openings 635 may be louvered and/or otherwise adjustable (for example, louvered openings 637 may be utilized). Additionally, any suitable combination of plain openings 635 and louvered openings 637 may be utilized. Moreover, openings 635 and/or louvered openings 637 may be configured with various sizes and/or shapes, as desired.

With reference now to FIG. 6D, in various exemplary embodiments modified cruciform parachute 600 is configured with multiple louvered openings 637 in order to provide increased gliding and/or steering capability. For example, louvered openings 637A are configured to exhaust internal pressure from the bottom of the opening, contributing primarily to a gliding capability. In contrast, louvered openings 637B are configured to exhaust internal pressure from the side of the opening, contributing primarily to a steering capability. It will be appreciated that in modified cruciform parachute 600, the ratio of plain openings 635 to louvered openings 637 (and/or the configuration of louvered openings 637) may be selected and/or adjusted to favor gliding over steering or to favor steering over gliding. In this manner, modified cruciform parachute 600 may be configured for a particular application, as desired.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, the invention has been described with reference to various embodiments. However, one of ordinary skill in the art appreciates that various modifications and changes can be made without departing from the scope of the present invention as set forth in the claims below. Accordingly, the specification is to be regarded in an illustrative rather than a restrictive sense, and all such modifications are intended to be included within the scope of the present invention. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A modified cruciform parachute, comprising:
a square center panel;
a square side panel, the side panel having similar dimensions to the center panel; and
a shoulder panel coupled to the side panel and to the center panel,
wherein the shoulder panel is configured in the shape of an isosceles triangle,
wherein the shoulder panel is coupled to the center panel along a first side of the shoulder panel,
wherein the shoulder panel is coupled to the side panel along a second side of the shoulder panel, and
wherein the third side of the shoulder panel is configured with a length of $(\sqrt{2}-1)$ times the length of the first side and the second side.

2. The modified cruciform parachute of claim 1, further comprising a corner panel coupled to the square side panel.

3. The modified cruciform parachute of claim 2, wherein at least two of the center panel, the side panel, the shoulder panel, and the corner panel are coupled via at least one frangible link, and wherein the frangible link is configured to sever upon exposure of the parachute to a selected dynamic pressure.

4. The modified cruciform parachute of claim 1, further comprising a corner panel coupled to the square side panel at discrete points along the common edge therebetween.

5. The modified cruciform parachute of claim 1, further comprising a louvered vent in the square side panel, wherein the louvered vent is coupled to a steering control line of the parachute.

6. The modified cruciform parachute of claim 1, wherein the shoulder panel equalizes the length of a first load path and a second load path in the modified cruciform parachute.

7. The modified cruciform parachute of claim 1, wherein all load paths in the modified cruciform parachute are of equal length.

8. The modified cruciform parachute of claim 1, wherein the shoulder panel comprises a two-dimensional piece of fabric.

9. A modified cruciform parachute, comprising:
- a center panel having a center panel side length along a first side of the center panel;
- a side panel having a side panel side length along a first side of the side panel, the side panel side length equal to the center panel side length; and
- a shoulder panel configured in the shape of an isosceles triangle,
- wherein the shoulder panel is coupled to the first side of the side panel along a first side of the shoulder panel,
- wherein the shoulder panel is coupled to the first side of the center panel along a second side of the shoulder panel, and
- wherein the third side of the shoulder panel is configured with a length of ($\sqrt{2}-1$) times the length of the first side and the second side of the shoulder panel.

* * * * *